US008786401B2

(12) United States Patent
Sobecki et al.

(10) Patent No.: US 8,786,401 B2
(45) Date of Patent: Jul. 22, 2014

(54) EXTENDABLE FLUSH DOOR HANDLE FOR VEHICLE

(75) Inventors: Justin E. Sobecki, Rockford, MI (US); Keith D. Foote, Grand Rapids, MI (US); Eric S. Deuel, Allendale, MI (US)

(73) Assignee: Magna Mirrors of America, Inc., Holland, MI (US)

(*) Notice: Subject to any disclaimer, the term of this patent is extended or adjusted under 35 U.S.C. 154(b) by 312 days.

(21) Appl. No.: 12/976,594

(22) Filed: Dec. 22, 2010

(65) Prior Publication Data

US 2011/0148575 A1 Jun. 23, 2011

Related U.S. Application Data

(60) Provisional application No. 61/352,466, filed on Jun. 8, 2010, provisional application No. 61/289,464, filed on Dec. 23, 2009.

(51) Int. Cl.
*B60R 25/00* (2013.01)

(52) U.S. Cl.
USPC .................... 340/5.72; 340/425.2; 340/539.1; 340/542; 340/5.1; 340/5.2; 340/5.6; 340/5.61; 70/149; 70/218; 70/264; 70/467

(58) Field of Classification Search
None
See application file for complete search history.

(56) References Cited

U.S. PATENT DOCUMENTS 3,667,315 A 6/1972 Polly, Sr.
3,737,944 A 6/1973 Szabo et al.
3,813,729 A 6/1974 Szabo et al.
3,908,149 A 9/1975 Gergoe et al.
4,041,301 A 8/1977 Pelchat
4,349,722 A 9/1982 Kurth et al.
4,471,209 A 9/1984 Hollander
4,580,822 A 4/1986 Fukumoto
4,686,741 A 8/1987 Moore et al.
4,837,892 A 6/1989 Lo
4,892,342 A 1/1990 Newman et al.
4,898,010 A 2/1990 Futami et al.
4,914,779 A 4/1990 Nakai et al.
4,983,947 A 1/1991 Mullen et al.
5,129,694 A 7/1992 Tanimoto et al.
(Continued)

FOREIGN PATENT DOCUMENTS

DE 3136468 3/1983
GB 1043210 9/1966
(Continued)

*Primary Examiner* — Curtis King
(74) *Attorney, Agent, or Firm* — Gardner, Linn, Burkhart & Flory, LLP

(57) ABSTRACT

An extendable flush door handle assembly for a door or liftgate of a vehicle includes a base portion and a handle portion movably attached to the base portion. The handle portion is movable between a recessed position, where the handle portion is at least partially received in the base portion, and a partially extended position, where the handle portion extends partially outward from the base portion and is graspable by a user. The handle portion is moved from the recessed position to the partially extended position responsive to a trigger, such as a signal from a key fob or a passive entry system or a vehicle door unlock button or the like. The handle portion, when in its recessed position, is at least partially received in the base portion so as to be not readily graspable by a user until the handle portion is moved toward its partially extended position.

24 Claims, 35 Drawing Sheets

(56) References Cited

U.S. PATENT DOCUMENTS

| | | | |
|---|---|---|---|
| 5,297,010 | A | 3/1994 | Camarota et al. |
| 5,298,306 | A | 3/1994 | Miller |
| 5,371,659 | A | 12/1994 | Pastrick et al. |
| 5,390,572 | A | 2/1995 | Gakhar et al. |
| 5,398,369 | A | 3/1995 | Heinzelman et al. |
| 5,497,305 | A | 3/1996 | Pastrick et al. |
| 5,497,306 | A | 3/1996 | Pastrick |
| 5,497,641 | A | 3/1996 | Linde et al. |
| 5,530,989 | A | 7/1996 | Remert et al. |
| 5,648,788 | A | 7/1997 | Bumsted |
| 5,651,163 | A | 7/1997 | Tamaki |
| 5,669,699 | A | 9/1997 | Pastrick et al. |
| 5,671,996 | A | 9/1997 | Bos et al. |
| 5,682,135 | A | 10/1997 | Labonde |
| 5,709,453 | A | 1/1998 | Krent et al. |
| 5,740,586 | A | 4/1998 | Gomas |
| 5,781,958 | A | 7/1998 | Meessmann et al. |
| 5,786,772 | A | 7/1998 | Schofield et al. |
| 5,823,654 | A | 10/1998 | Pastrick et al. |
| 5,828,299 | A | 10/1998 | Chen |
| 5,844,470 | A | 12/1998 | Garnault et al. |
| 5,857,241 | A | 1/1999 | Camp et al. |
| 5,929,786 | A | 7/1999 | Schofield et al. |
| 5,938,321 | A | 8/1999 | Bos et al. |
| 5,952,731 | A | 9/1999 | McPherson et al. |
| 5,956,799 | A | 9/1999 | Panaccione et al. |
| 5,960,942 | A | 10/1999 | Thornton |
| 6,018,841 | A | 2/2000 | Kelsay et al. |
| 6,036,244 | A | 3/2000 | Tyves et al. |
| 6,070,998 | A | 6/2000 | Jennings et al. |
| 6,075,294 | A | 6/2000 | Van den Boom et al. |
| 6,084,317 | A | 7/2000 | Wolfe et al. |
| 6,086,229 | A | 7/2000 | Pastrick |
| 6,093,978 | A | 7/2000 | Benard et al. |
| 6,098,433 | A | 8/2000 | Maniaci |
| 6,135,621 | A | 10/2000 | Bach et al. |
| 6,139,172 | A | 10/2000 | Bos et al. |
| 6,149,287 | A | 11/2000 | Pastrick et al. |
| 6,152,590 | A | 11/2000 | Furst et al. |
| 6,158,867 | A | 12/2000 | Parker et al. |
| 6,164,805 | A | 12/2000 | Hulse |
| 6,176,602 | B1 | 1/2001 | Pastrick et al. |
| 6,180,212 | B1 | 1/2001 | Single et al. |
| 6,198,409 | B1 | 3/2001 | Schofield et al. |
| 6,218,933 | B1 | 4/2001 | Josserand et al. |
| 6,227,689 | B1 | 5/2001 | Miller |
| 6,234,548 | B1 | 5/2001 | Mittelbach et al. |
| 6,239,693 | B1 | 5/2001 | Benard et al. |
| 6,276,821 | B1 | 8/2001 | Pastrick et al. |
| 6,280,069 | B1 | 8/2001 | Pastrick et al. |
| 6,291,905 | B1 | 9/2001 | Drummond et al. |
| 6,304,168 | B1 | 10/2001 | Ohta et al. |
| 6,349,450 | B1 | 2/2002 | Koops et al. |
| 6,353,415 | B1 | 3/2002 | Ashtiani et al. |
| 6,367,295 | B1 | 4/2002 | Agostini et al. |
| 6,378,344 | B1 | 4/2002 | Gartner |
| 6,396,408 | B2 | 5/2002 | Drummond et al. |
| 6,416,208 | B2 | 7/2002 | Pastrick et al. |
| 6,433,728 | B1 | 8/2002 | Krupp et al. |
| 6,477,464 | B2 | 11/2002 | McCarthy et al. |
| 6,550,103 | B2 | 4/2003 | Koops et al. |
| 6,550,946 | B2 | 4/2003 | Misawa et al. |
| 6,556,125 | B1 | 4/2003 | Rohrl |
| 6,568,839 | B1 | 5/2003 | Pastrick et al. |
| 6,577,228 | B1 | 6/2003 | Tsuchida et al. |
| 6,582,109 | B2 | 6/2003 | Miller |
| 6,621,178 | B2 | 9/2003 | Morillon |
| 6,669,267 | B1 | 12/2003 | Lynam et al. |
| 6,700,476 | B1 | 3/2004 | Okada et al. |
| 6,795,032 | B2 | 9/2004 | Ieda et al. |
| 6,812,823 | B2 | 11/2004 | Inaba et al. |
| 6,847,289 | B2 | 1/2005 | Pang et al. |
| 6,854,870 | B2 | 2/2005 | Huizenga |
| 6,871,887 | B2 | 3/2005 | Jooss et al. |
| 6,907,643 | B2 | 6/2005 | Koops et al. |
| 6,969,101 | B2 | 11/2005 | Lynam et al. |
| 6,977,619 | B2 | 12/2005 | March et al. |
| 7,005,959 | B2 | 2/2006 | Amagasa et al. |
| 7,188,963 | B2 | 3/2007 | Schofield et al. |
| 7,199,317 | B2 | 4/2007 | Ieda et al. |
| 7,210,715 | B2 | 5/2007 | Kobayashi et al. |
| 7,289,037 | B2 | 10/2007 | Uken et al. |
| 7,407,203 | B2 | 8/2008 | Huizenga et al. |
| 7,492,281 | B2 | 2/2009 | Lynam et al. |
| 7,581,859 | B2 | 9/2009 | Lynam |
| 7,626,749 | B2 | 12/2009 | Baur et al. |
| 8,052,188 | B2 * | 11/2011 | Chernoff et al. ............. 296/1.02 |
| 2001/0011836 | A1 * | 8/2001 | Grey ............................. 296/214 |
| 2004/0031301 | A1 * | 2/2004 | Dominique ..................... 70/237 |
| 2004/0070489 | A1 * | 4/2004 | Ueda et al. ................... 340/5.61 |
| 2008/0163555 | A1 * | 7/2008 | Thomas et al. ................. 49/460 |
| 2009/0039671 | A1 * | 2/2009 | Thomas et al. ............ 296/146.1 |
| 2009/0040306 | A1 | 2/2009 | Foote et al. |
| 2009/0115631 | A1 | 5/2009 | Foote et al. |
| 2010/0007463 | A1 | 1/2010 | Dingman et al. |
| 2010/0088855 | A1 | 4/2010 | Ruse et al. |
| 2010/0182143 | A1 | 7/2010 | Lynam |

FOREIGN PATENT DOCUMENTS

| | | |
|---|---|---|
| GB | 2298748 | 9/1996 |
| WO | WO8807118 | 9/1988 |
| WO | WO2006124682 | 11/2006 |
| WO | WO2008051910 | 5/2008 |
| WO | WO2008137634 | 11/2008 |

* cited by examiner

EXTENDABLE FLUSH DOOR HANDLE FOR VEHICLE

CROSS REFERENCE TO RELATED APPLICATIONS

The present application claims priority benefit of U.S. provisional applications, Ser. No. 61/352,466, filed Jun. 8, 2010, and Ser. No. 61/289,464, filed Dec. 23, 2009, which are hereby incorporated herein by reference in their entireties.

FIELD OF THE INVENTION

The present invention relates to handles for vehicles and, more particularly, to an exterior handle for opening a side door and/or liftgate of a vehicle or interior handle for opening a side door and/or liftgate of a vehicle.

BACKGROUND OF THE INVENTION

A door handle for a vehicle door typically includes a handle portion that is pivotable relative to a base portion, whereby pivotal movement of the handle portion pulls at a cable or rod to actuate a latch mechanism to open the door. Typically, a door handle is a pull strap handle with a strap handle portion that protrudes outwardly from the side of the vehicle for grasping by the person opening the door of the vehicle. Alternately, paddle type door handle assemblies are known, where a paddle portion is pivotally mounted to a base portion and is pulled generally outwardly and upwardly to open the vehicle door. Such paddle type door handle assemblies typically protrude outwardly from the vehicle door when in their unpulled state and have an open recess below the paddle portion for receiving a user's fingers for grasping the paddle portion.

SUMMARY OF THE INVENTION

The present invention provides an extendable flush door handle assembly for opening a door of a vehicle (such as a side door or rear door or liftgate of a vehicle) that includes a handle portion that is disposed at the door such that, when not in use to open the vehicle door, the outer surface of the handle portion is generally flush with or generally coplanar with (or only slightly protruding from) the outer surface of the door panel. The door handle assembly may be operable to extend the handle portion outward from the door panel when a user is to use the handle to open the vehicle door, such as in response to a signal from a key fob or a passive entry system or the like. When so extended, the handle may be readily grasped by the user and actuated or pulled or moved further outward to open the vehicle door. After the user releases the handle, the handle may return to its non-use position where its outer surface is generally flush or coplanar with (or only slightly protruding from) the outer surface of the door panel.

According to an aspect of the present invention, a handle assembly for a door of a vehicle comprises a base portion mounted at or incorporated into a structure of the door of the vehicle and a handle portion movable relative to the base portion. The handle portion is movable between an initial or non-use a recessed position, where the handle portion is at least partially received in or recessed at the base portion, and a partially extended or ready position, where the handle portion extends partially outward from the base portion to be graspable by a user. The handle portion moves from the recessed position to the partially extended position responsive to a trigger or signal. A user may grasp the handle when it is in the ready position and may move the handle to open the vehicle door.

The handle assembly may be mounted at a structure of one of (a) a side door of the vehicle, (b) a rear door of the vehicle and (c) a liftgate of the vehicle. The door assembly may include an actuator that is operable to electromechanically move the handle portion from its recessed position to its partially extended position responsive to the trigger. The trigger may comprise at least one of (a) a signal from a passive entry device, (b) a signal from a remote transmitting device and (c) a signal indicative of a user actuating a door unlock button of the vehicle.

The present invention thus may provide a door handle assembly that is generally flush with the outer or exterior surface of the exterior panel of a vehicle door. The door handle may include a handle portion that cooperates with the door panel of the vehicle door to provide a generally flush, closed or uniform appearance of the door handle at the door when the door handle is not in use, with the door handle being movable or pivotable outward to facilitate grasping of the handle by a user when it is desired to open the vehicle door.

These and other objects, advantages, purposes and features of the present invention will become apparent upon review of the following specification in conjunction with the drawings.

DESCRIPTION OF THE PREFERRED EMBODIMENTS

Figure 1:
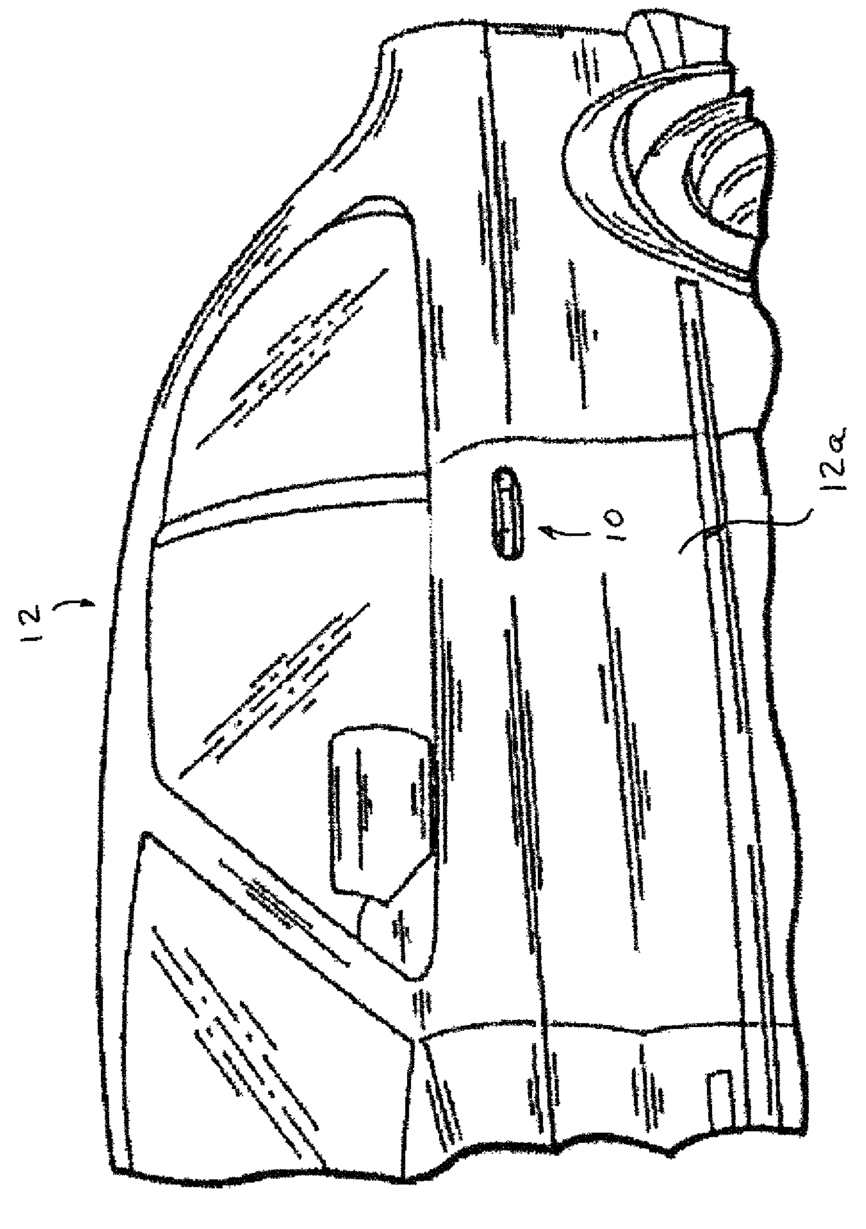
FIG. 1 is a perspective view of a vehicle with an extendable flush door handle assembly in accordance with the present invention.
Figure 2:
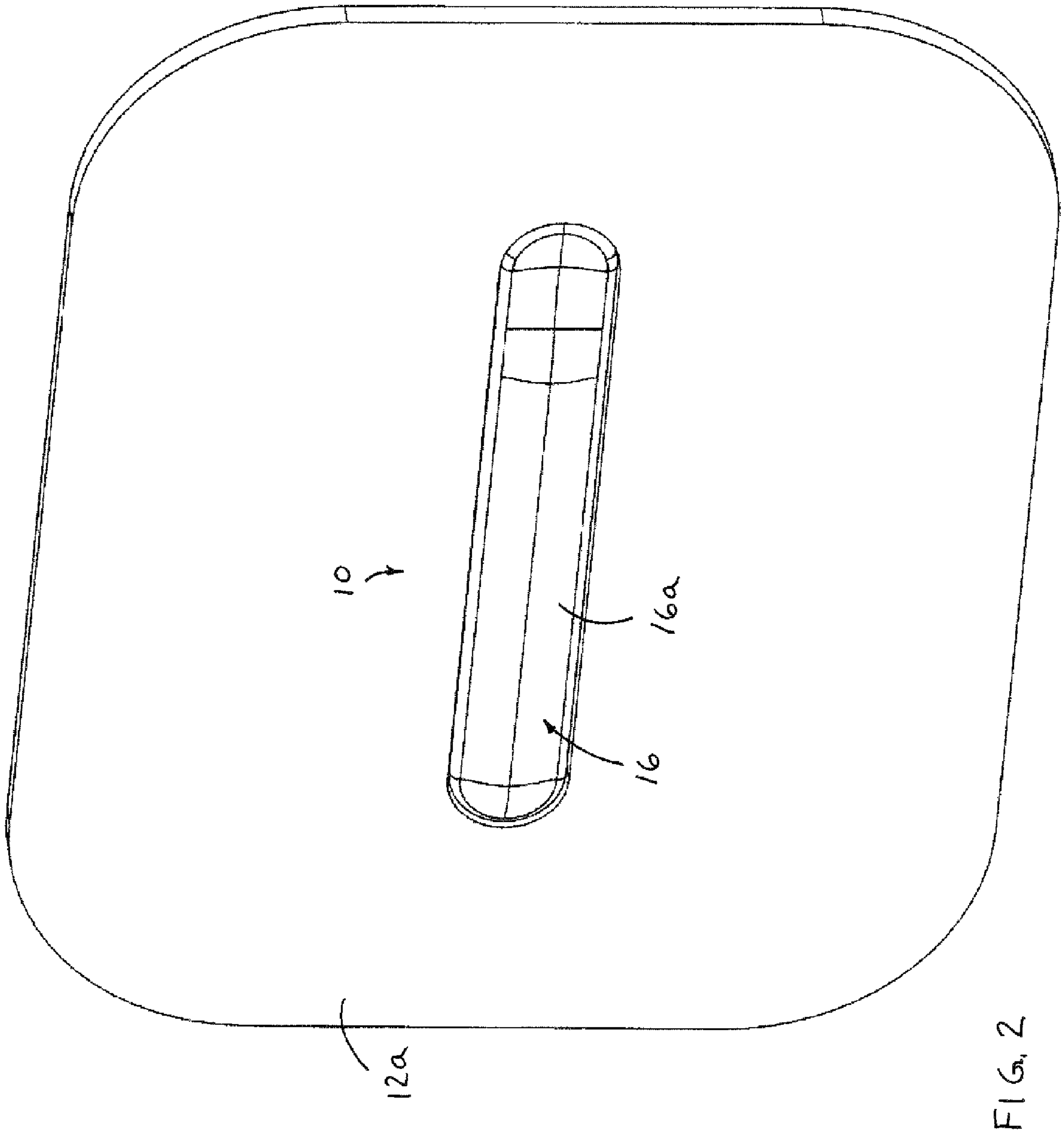
FIG. 2 is an enlarged perspective view of the extendable flush door handle assembly at the vehicle door, with the door handle in its flush or non-use position.
Figure 3:
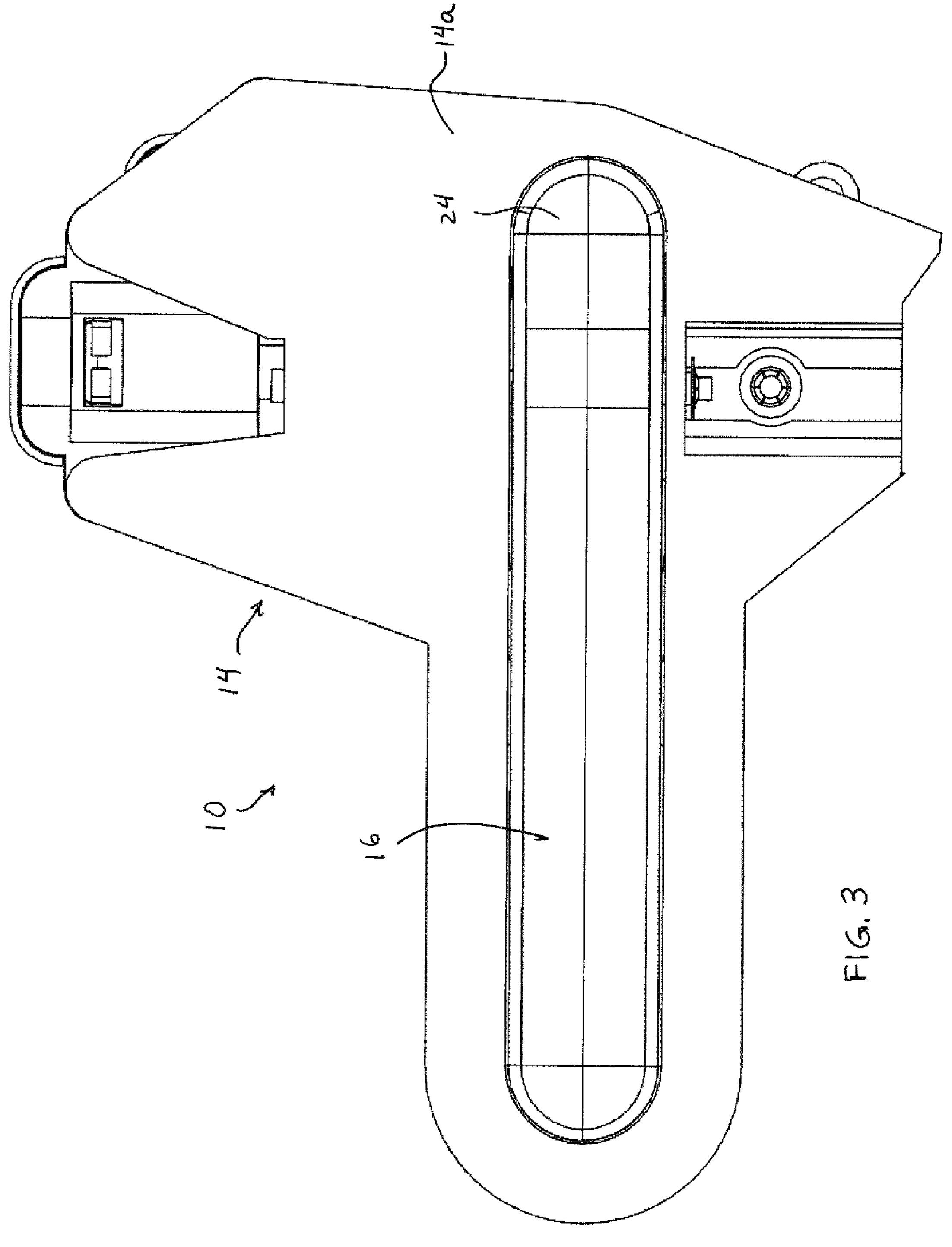
FIG. 3 is a plan view of the extendable flush door handle assembly of the present invention.
Figure 4:
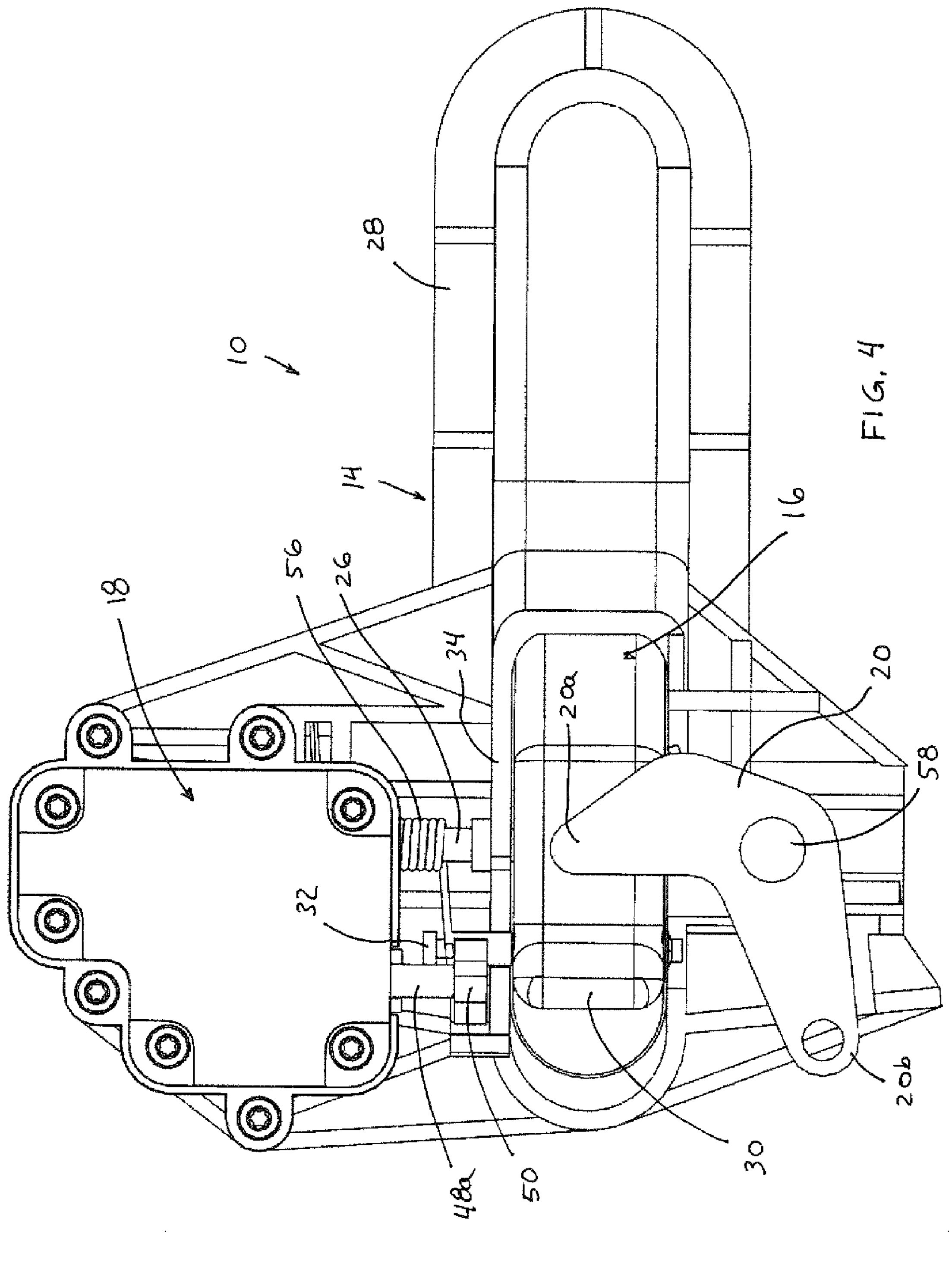
FIG. 4 is an opposite plan view of the door handle assembly of FIG. 3.
Figure 5:
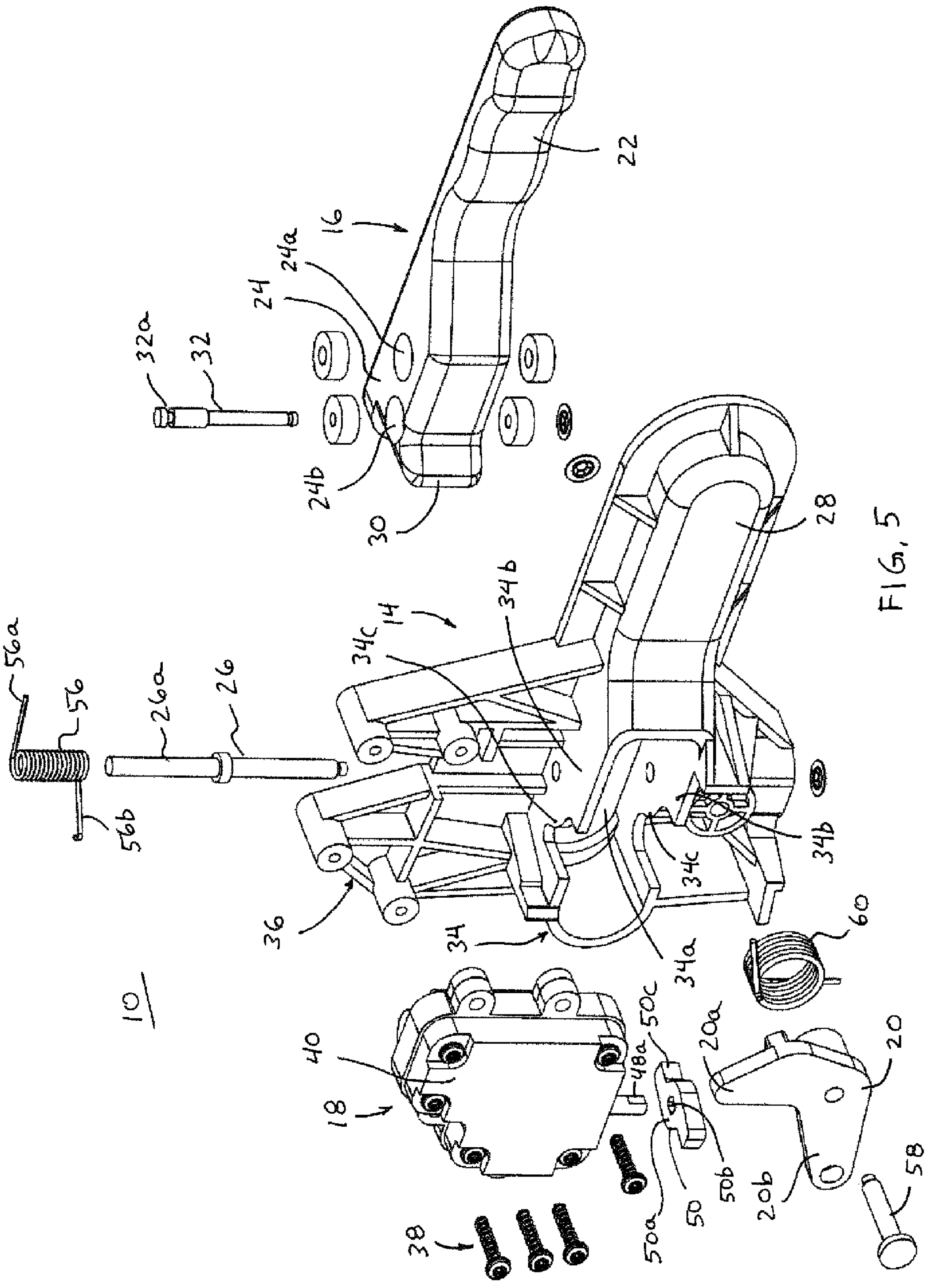
FIG. 5 is an exploded perspective view of the extendable flush door handle assembly of the present invention.
Figure 6:
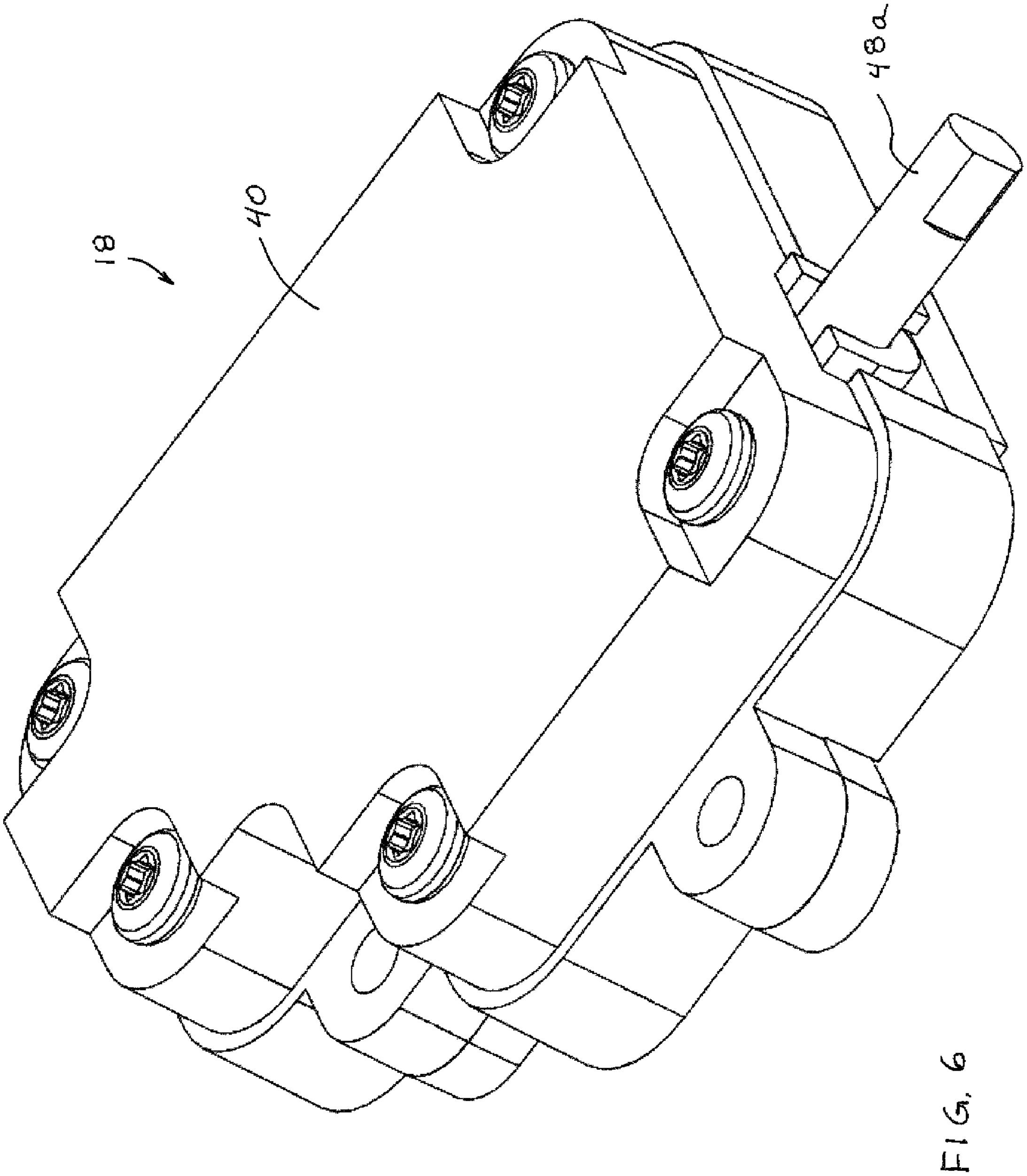
FIG. 6 is a perspective view of an actuator for moving or pivoting the door handle of the extendable flush door handle assembly of the present invention to a use position.

Referring now to the drawings and the illustrative embodiments depicted therein, a vehicle handle assembly or module or unit or extendable flush door handle assembly 10 is mountable to a door 12*a* of a vehicle 12 and operable to release a latch mechanism of the vehicle door 12*a* to open the vehicle door (FIG. 1). Vehicle handle assembly 10 includes a base portion or bracket 14 that is mountable to a vehicle door and a handle or strap portion 16 that is pivotally mounted to the door or to a second or front base portion or bracket mounted to the door. When not in use, the handle portion is at an initial rest or recessed or non-use position and is received or disposed at or partially in base portion 14 so that an outer surface 16*a* of handle portion 16 is generally flush with or generally coplanar with (or protruding only slightly from or recessed slightly from) the outer surface 14*a* of the base portion 14 or the door panel, whereby the handle portion is not readily usable by a user. Handle portion 16 is electromechanically pivotable or movable or laterally movable relative to the door and the base portion 14 to move to its ready or operational or grippable or graspable or person-operable position and is then graspable or grippable by a user and is manually moved (such as via pulling by the user) to actuate an actuating lever or member or arm 20 at base portion 14, which in turn moves a cable or rod or linkage or the like to actuate or release the latch mechanism of the door to open the vehicle door. Handle assembly 10 includes an electrically operable or electromechanical actuator 18 at the base portion 14 for imparting the movement of handle portion 16 relative to base portion 14 (such as automatically imparting such handle movement in response to a signal from a key fob or a passive entry system or the like) so that handle portion 16 is automatically moved from its recessed position to its ready or graspable position where a user can grasp the handle portion to pull or move the handle portion for unlatching and/or opening the vehicle door and/or the like, as discussed below.

Handle assembly 10 may comprise any suitable type of handle assembly, and may include or incorporate aspects of the door handle assemblies described in U.S. Pat. No. 6,977,619, and/or U.S. Pat. Publication No. US 2006/0038418, published Feb. 23, 2006, and/or PCT Application No. PCT/US08/062,347, filed May 2, 2008, which are hereby incorporated herein by reference in their entireties. Optionally, aspects of handle assembly 10 may be suitable for use with a liftgate handle assembly for a liftgate or tailgate of a vehicle, while remaining within the spirit and scope of the present invention.

In the illustrated embodiment, handle or strap portion 16 includes a grasping portion 22 for a user to grab and pull at to open the vehicle door. Handle portion 16 has a base end 24 that is pivotally mounted to base portion 14 via a pivot pin 26, with grasping portion 22 extending from base end 24 and along a handle receiving portion 28 of base portion 14. Base end 24 has an aperture or passageway 24*a* established therethrough for receiving pivot pin 26 to pivotally attach or mount handle portion 16 to base portion 14. Handle portion 16 has a protrusion or extension or arm 30 extending from base end 24 for engaging and actuating or moving the actuating lever 20 when the handle is moved to open the vehicle door. In the illustrated embodiment, base end 24 has a second aperture or passageway or recess 24*b* established at least partially therethrough for receiving a guide pin 32 therein or therethrough for moving the handle portion to its use position, as discussed below.

Although shown as a strap type handle, the handle assembly may comprise any suitable type of vehicle door handle assembly, such as a paddle type vehicle door handle assembly (having a paddle or handle portion that is pivotable about a generally horizontal pivot axis to open the vehicle door, such as discussed below and/or such as a handle assembly of the types described in U.S. Pat. Nos. 6,349,450; 6,550,103; and 6,907,643, which are hereby incorporated herein by reference in their entireties) or other type of vehicle door handle assembly, while remaining within the spirit and scope of the present invention. Optionally, the door handle assembly may include a soft touch handle portion, such as utilizing the principles described in U.S. Pat. Nos. 6,349,450; 6,550,103; and 6,907,643, which are hereby incorporated herein by reference in their entireties.

Figure 10:
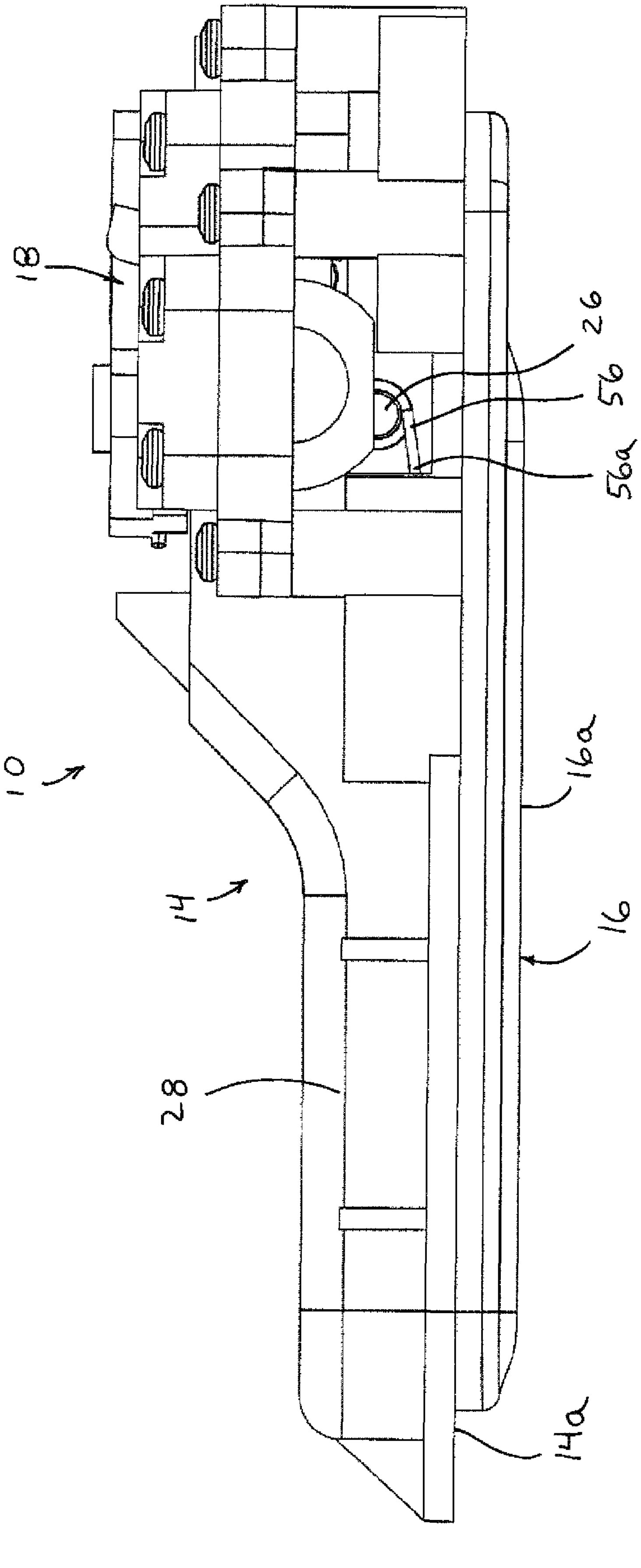
FIG. 10 is a top plan view of the extendable flush door handle assembly of the present invention, shown with the door handle in its flush or non-use or recessed position.
Figure 11:
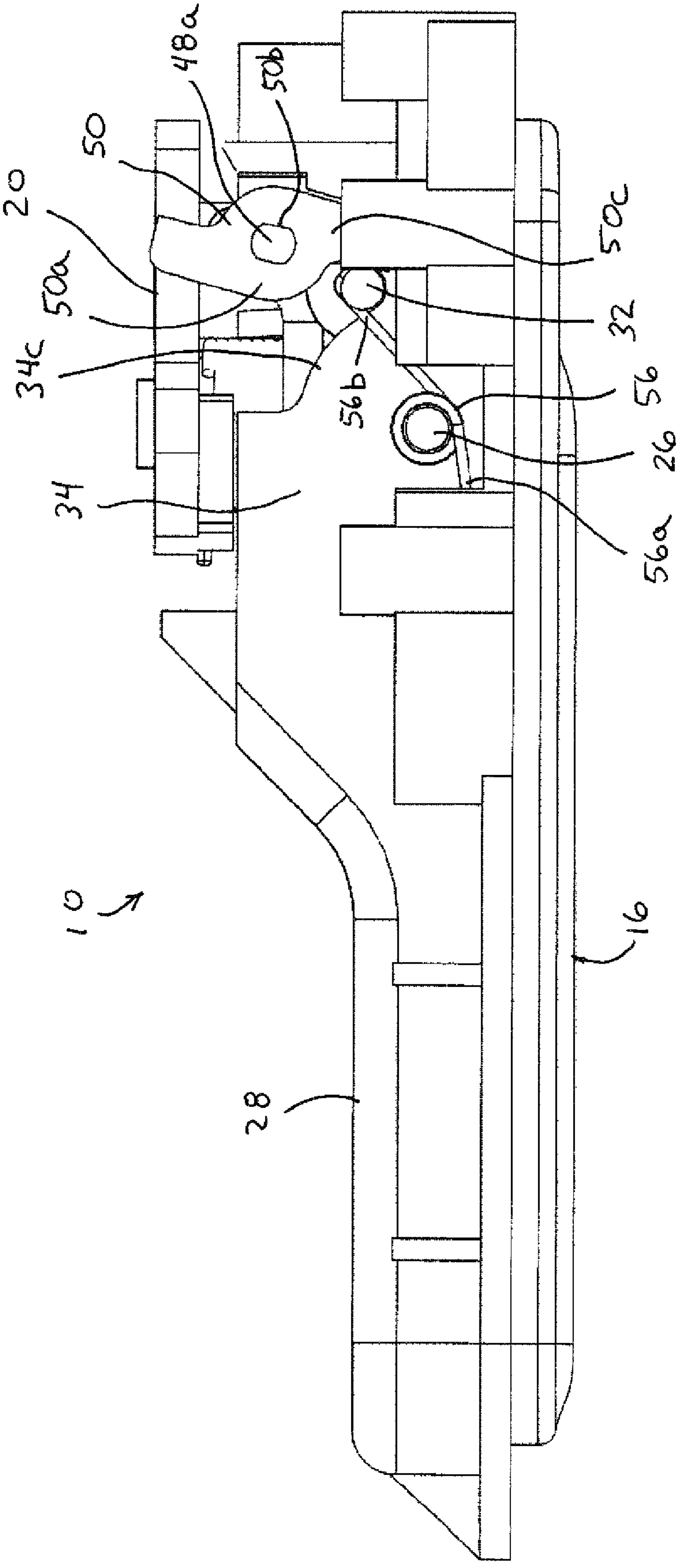
FIG. 11 is another top plan view of the door handle assembly of FIG. 10, shown with the actuator removed to show additional details.

Base portion 14 includes handle receiving portion 28 for receiving the grasping portion 22 when the handle portion 16 is in its non-use or flush or recessed position and a handle attaching portion 34 at which handle portion 16 is pivotally attached via pivot pin 26. Handle receiving portion 28 extends from handle attaching portion 34 and is configured to receive grasping portion 22 of handle portion 16 when handle portion 16 is in its non-use or flush or recessed position, such that the outer surface 16*a* of handle portion 16 is generally flush or slightly protrudes (or optionally is slightly recessed) at or in handle receiving portion 28 (as shown in FIGS. 10 and 11) and/or the outer surface of the door panel at which the handle assembly is mounted.

Base portion 14 is configured to receive grasping portion 22 of handle portion 16 therein when handle portion 16 is in its recessed position, so that the handle rests or nests neatly in the base portion, with its outer surface generally flush with or protruding slightly from the vehicle door and with no pocket or recess around the handle that receives a user's hand when the handle is retracted or nested in the base portion (such as a hand receiving pocket formed or established below the handle for allowing a user to insert their hand into the pocket to grasp the handle when the handle is retracted). When partially extended to its graspable or use position, the handle extends a sufficient amount (such as to a desired or appropriate angle of extension or pivotal movement) to provide sufficient clearance a person's hand to grasp the partially extended grasping portion of the handle. Preferably, for example, the electrically extendable flush handle can extend (to a selected dimension and/or angle and/or extent) sufficiently from the vehicle to allow, for example, a large hand and/or for a gloved hand in winter to grasp and operate the handle, with such degree of extension being otherwise unacceptable aesthetically and aerodynamically for non-extendable door handle paddle or strap assemblies.

Handle attaching portion 34 of base portion 14 has an aperture 34*a* that receives base end 24 of handle portion 16 when handle portion 16 is pivotally attached to base portion 14 via pivot pin 26. In the illustrated embodiment, handle attaching portion 34 has opposite attaching walls 34*b* with apertures therethrough for receiving pivot pin 26. The attaching walls 34*b* include arcuate guide portions 34*c* along which guide pin 32 moves when the handle portion 16 is moved to its ready position by actuator 18 and when the handle portion 16 is moved by a user to open the vehicle door.

Figure 7:
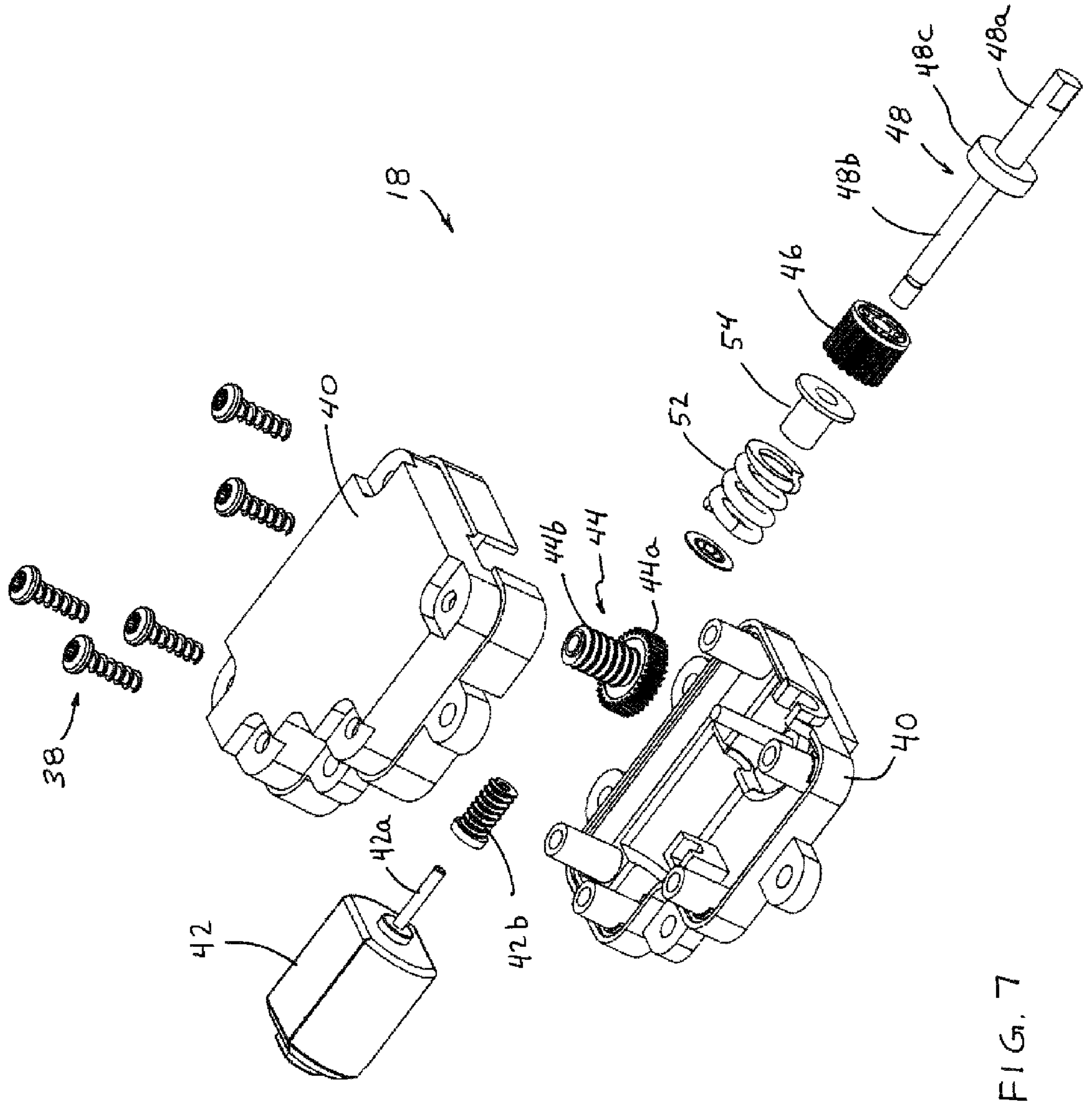
FIGS. 7 and 8 are exploded perspective views of the actuator of FIG. 6.
Figure 8:
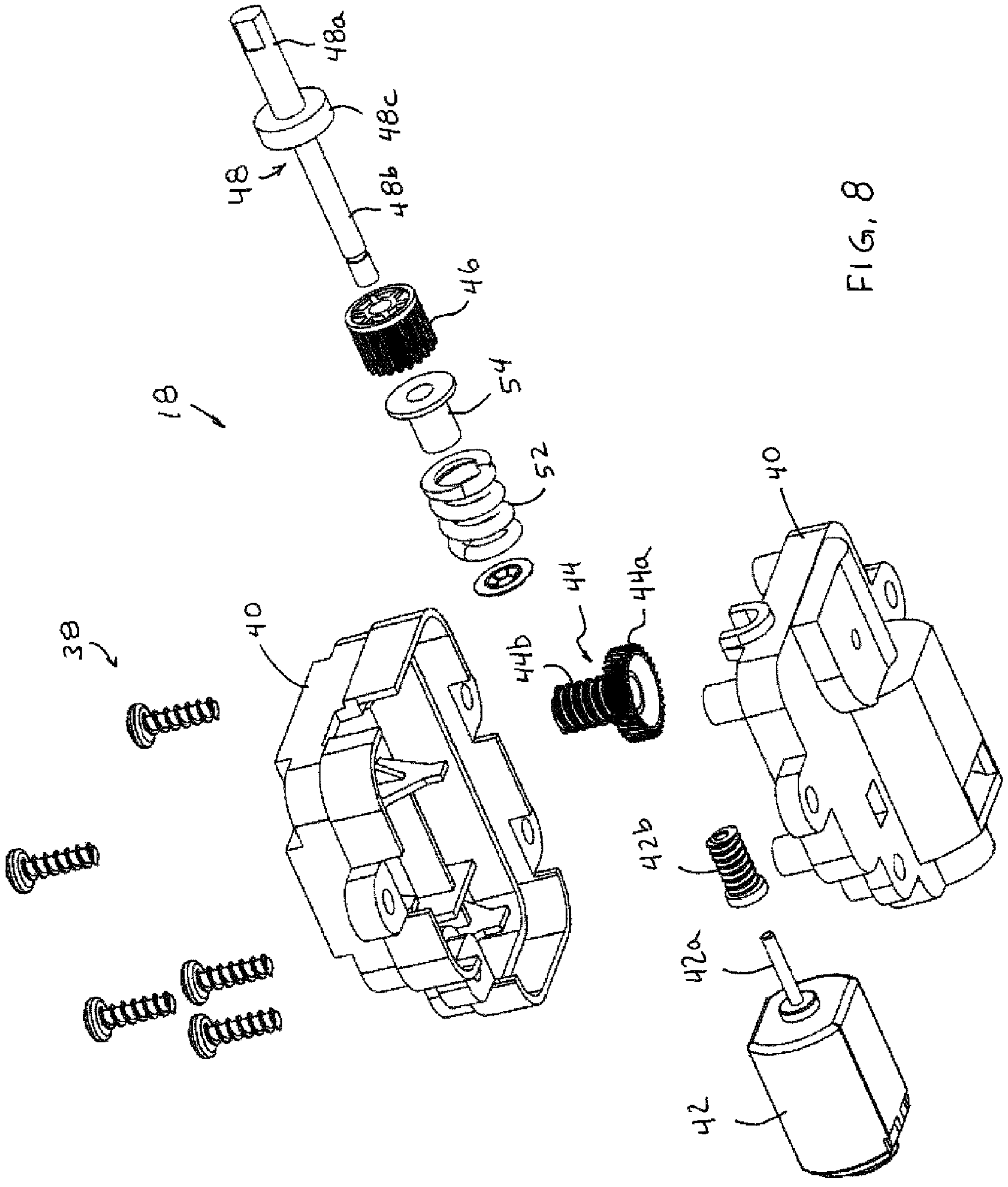
Figure 9:
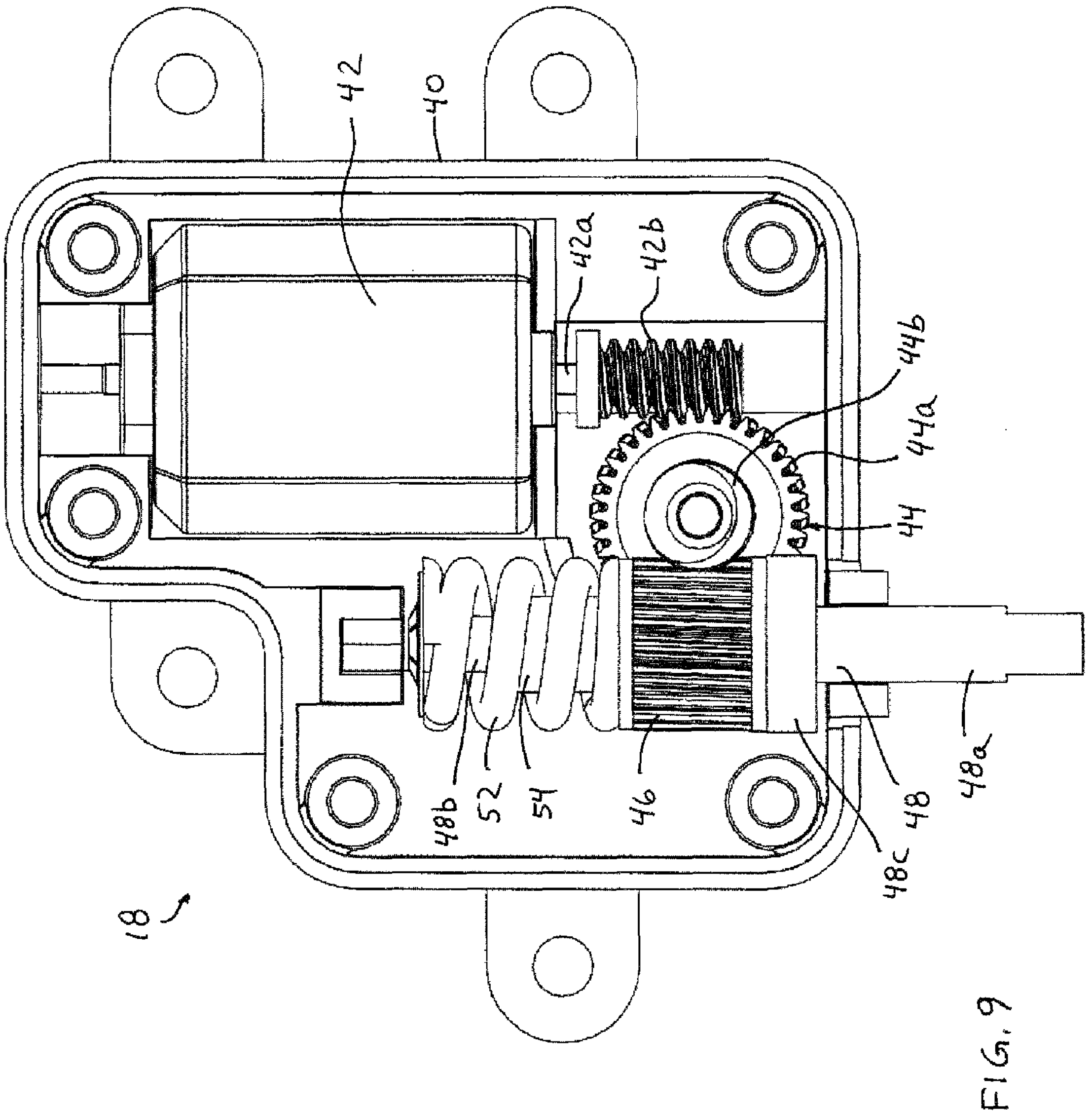
FIG. 9 is a plan view of the actuator of FIG. 6, with one of the cover portions removed to show the internal components.

Actuator 18 is attached or fastened or secured to a mounting portion 36 of base portion 14, such as via a plurality of fasteners 38 (or the actuator may be otherwise formed or established at the base portion, such as via a snap connection or via integral forming of a housing of the actuator with the base portion or the like). As shown in FIGS. 7-9, actuator 18 comprises a housing or casing 40 that houses an electric motor 42 that is operable to rotate an output shaft 42*a* in either direction, such as in response to an actuating signal. Output shaft 42*a* is received in a worm gear or helical gear 42*b* that engages a gear member 44 that has a gear portion 44*a* for engaging gear 42*b* and a helical gear portion 44*b* for engaging another gear element 46 that is disposed on an output shaft 48. Output shaft 48 is rotatably mounted to housing portion 40 and has a keyed end or engaging end or portion 48*a* that extends from housing 40 for engaging an actuating element 50, discussed below. A biasing element or spring 52 and an engaging element 54 are disposed on output shaft 48 and at a mounting end or portion 48*b* of output shaft to bias or urge or maintain gear element 46 against a collar portion 48*c* of output shaft 48 so that output shaft 48 rotates with gear element 46 when motor 42 is actuated.

Thus, when motor 42 is actuated to rotate output shaft 42*a*, the gears cooperate to impart a corresponding rotation of keyed end 48*a* of output shaft 48. Keyed end 48*a* is non-rotatably or fixedly received in actuating element 50 to rotate actuating element 50 in either direction. In the illustrated embodiment, actuating element 50 comprises a central portion 50*a* having an aperture 50*b* therethrough and an actuating arm 50*c* extending radially outwardly from central portion 50*a*. Actuating arm 50*c* engages guide pin 32, which protrudes from base end 24 of handle portion 16, and, responsive to actuation of motor 42, imparts an arcuate movement of guide pin 32 along guide portion 34*c* of handle attaching portion 34 of base portion 14, which in turn imparts a pivotal movement of handle portion 16 about pivot pin 26.

In the illustrated embodiment, pivot pin 26 is received through attaching walls 34*b* and through base end 24 of handle portion 16 and includes an end portion 26*a* that extends from attaching walls 34*b*. A biasing element 56 (such as a torsional spring or the like) is disposed at end portion 26*a* and has one end 56*a* that engages base portion 14 and an opposite or biasing end 56*b* that engages a groove or notch 32*a* of guide pin 32 to bias or urge guide pin 32 towards an initial position and, thus, to bias or urge handle portion 16 towards its initial or non-use or flush position. When the actuator 18 is actuated to pivot actuating element 50 to move guide pin 32 along guide portion 34*c* of handle attaching portion 34, the guide pin 32 is moved against the biasing force of biasing element 56 to move the handle to its ready position, where extension 30 of base end 24 of handle portion 16 is moved towards engagement with actuating lever or arm 20, whereby further pivotal or pulling movement of the handle portion 16 (such as by a user grasping the grasping portion of the handle and pulling outward away from the door) urges extension 30 against actuating lever 20 to pivot or move actuating lever 20 to open the vehicle door.

Figure 14:
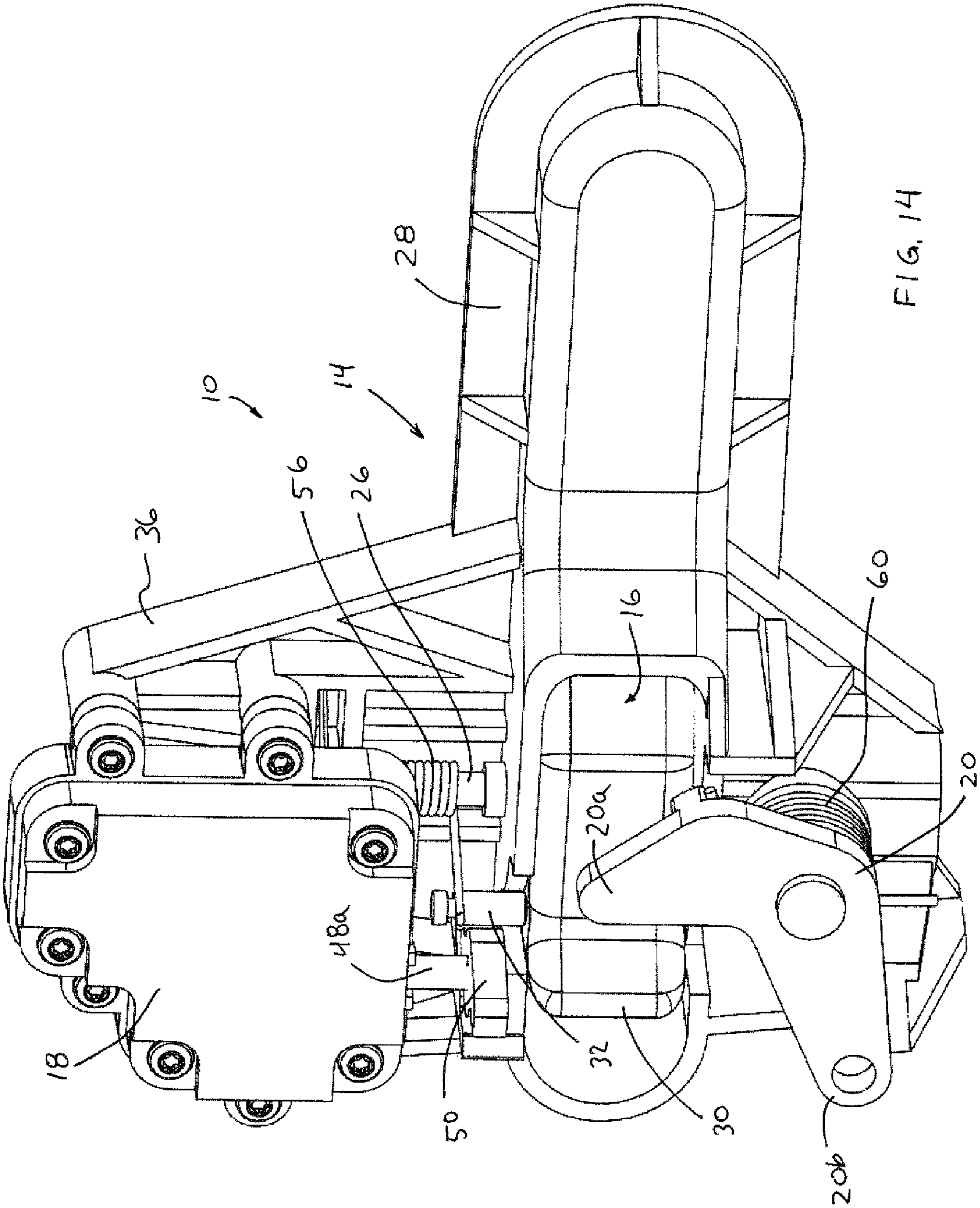
FIG. 14 is a perspective view of the extendable flush door handle assembly of the present invention, shown with the door handle in its flush or non-use or recessed position.
Figure 15:
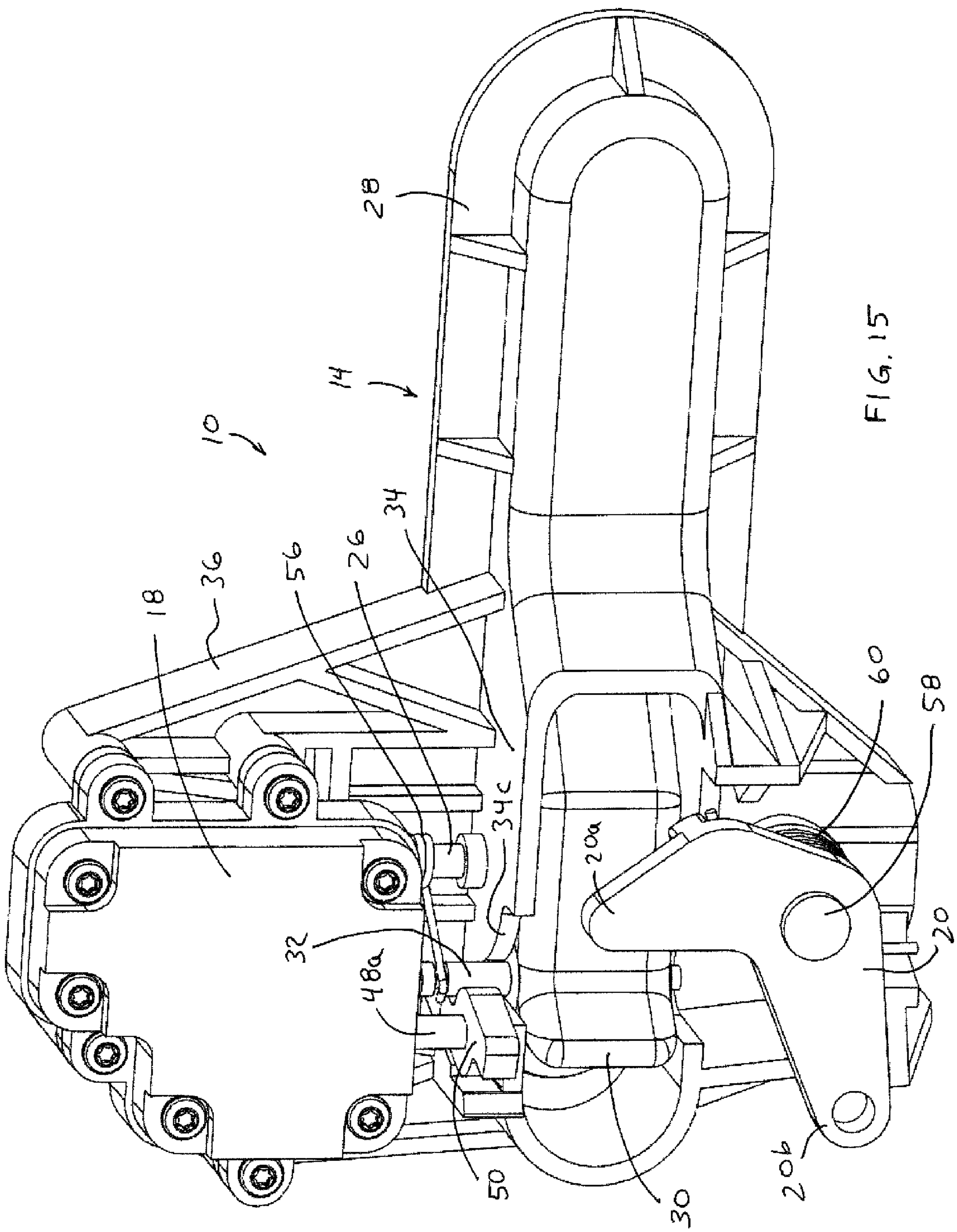
FIG. 15 is another perspective view of the door handle assembly of FIG. 14.

In the illustrated embodiment, actuating lever 20 comprises a generally L-shaped lever with a handle engaging portion 20*a* and a cable or rod or latch mechanism actuating portion 20*b*. Actuating lever 20 is pivotally mounted at handle attaching portion 34 of base portion 14 via a pivot pin 58 and is biased towards its initial position (FIGS. 14 and 15) via a biasing element 60 (such as a torsional spring or the like). Latch mechanism actuating portion 20*b* is configured to attach to or connect to a rod or cable or linkage such that movement of the actuating portion 20*b* imparts a movement of the linkage to actuate a latch mechanism of the vehicle door to open the vehicle door (optionally, the door handle assembly may electronically actuate a latch mechanism of the vehicle door in response to the handle portion being pulled or moved by a user, while remaining within the spirit and scope of the present invention).

Figure 12:
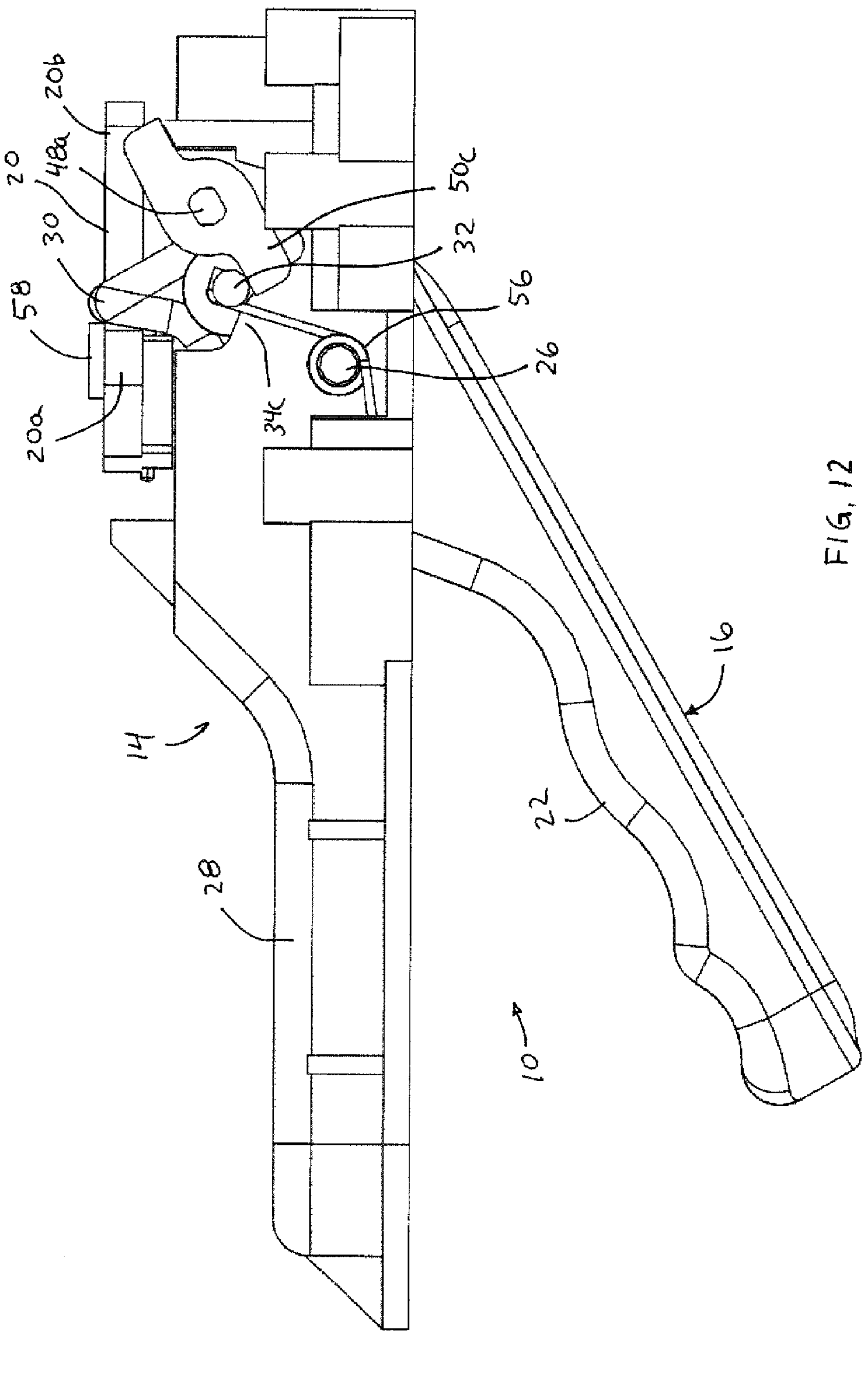
FIG. 12 is another top plan view of the door handle assembly of FIG. 11, shown with the door handle moved to its use or ready or partially extended position.
Figure 16:
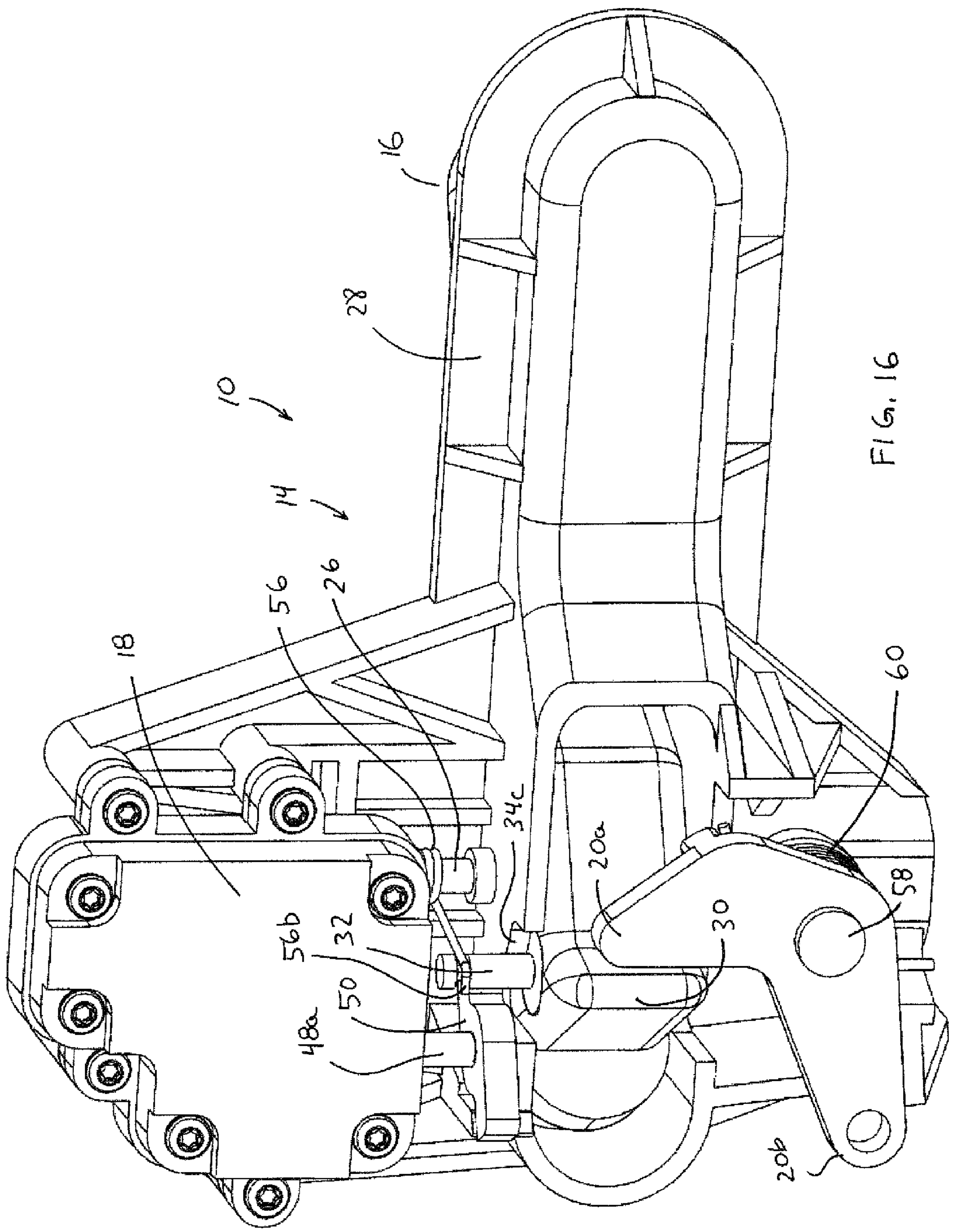
FIG. 16 is another perspective view of the door handle assembly of FIG. 14, shown with the door handle in its use or ready or partially extended position.

When the actuator 18 is actuated (such as by a control signal or the like from a vehicle or door control module or the like), the output shaft 48*a* of the actuator is rotated to rotate the actuating element 50 to move the guide pin 32 along the guide surface 34*c* of the handle mounting portion 34 of the base portion 14, whereby the door handle portion 16 is moved or pivoted from its non-use or flush or recessed or initial position (FIGS. 1, 2, 3, 10, 11, 14 and 15) to its ready or partially extended or graspable position (FIGS. 12 and 16).

Figure 13:
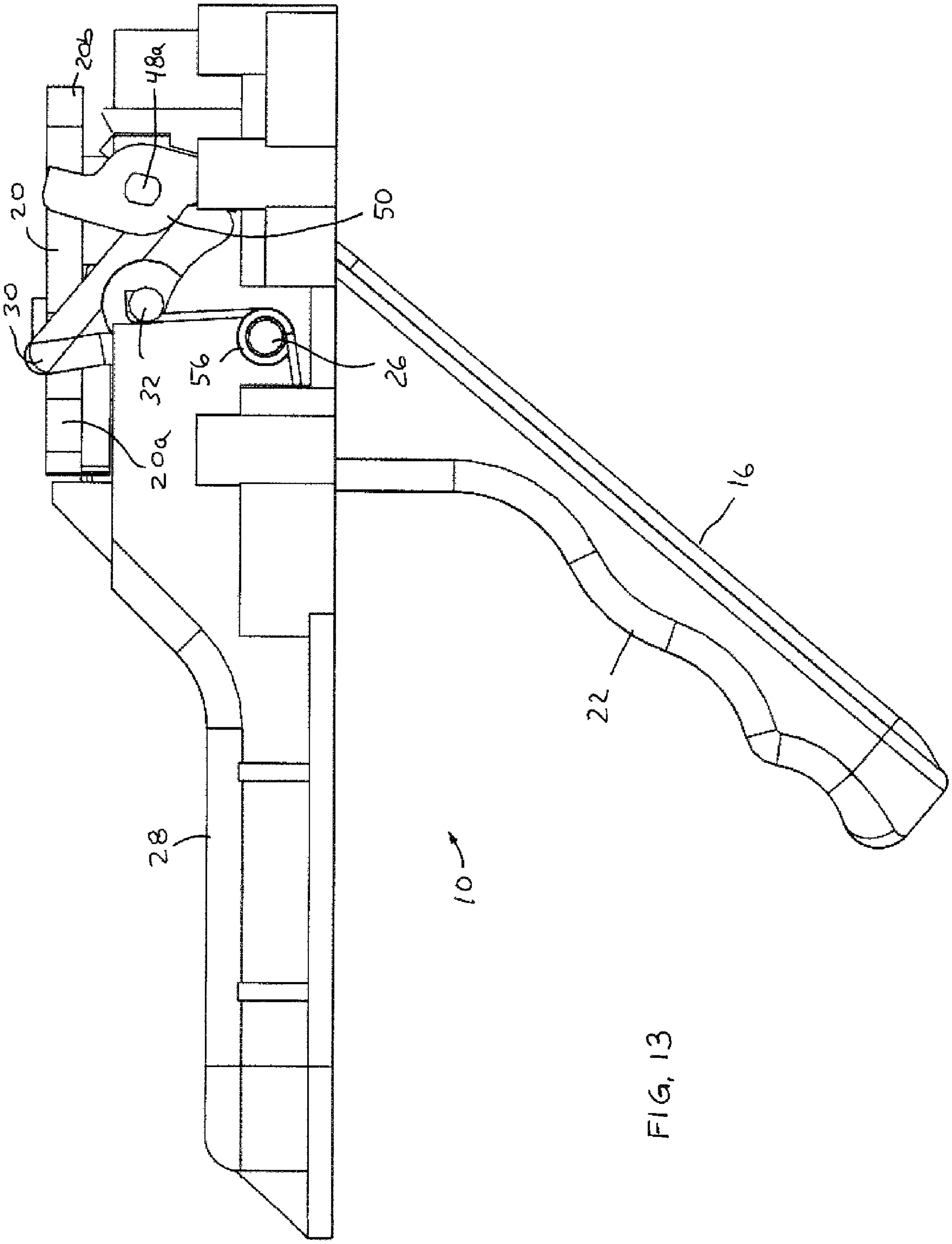
FIG. 13 is another top plan view of the door handle assembly of FIG. 11, shown with the door handle pulled or moved to open the vehicle door.
Figure 17:
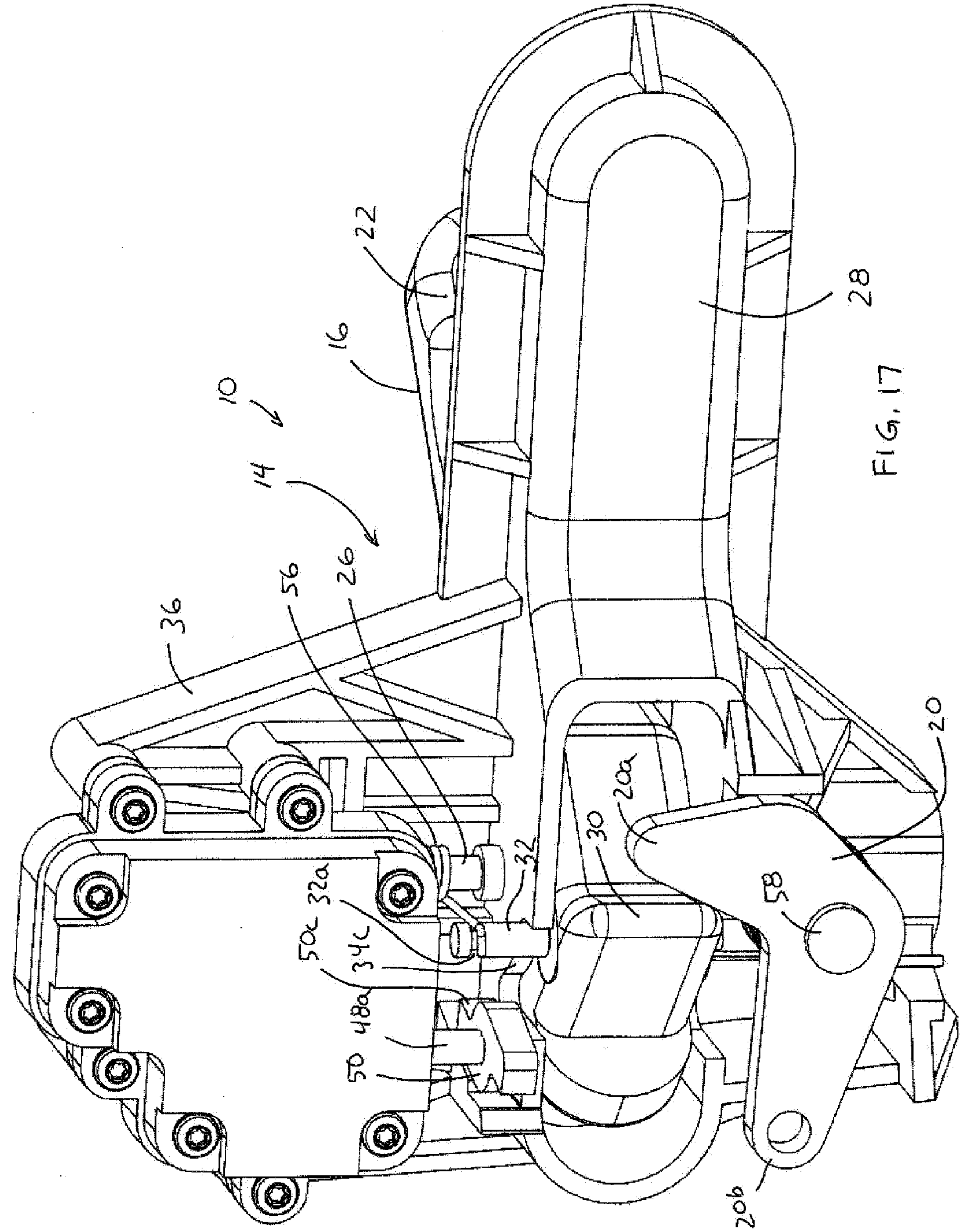
FIG. 17 is another perspective view of the door handle assembly of FIG. 14, shown with the door handle pulled outward to open the vehicle door.

When in its ready position, a user may readily grasp the grasping portion 22 of handle portion 16 (which is exposed and graspable when the handle portion is at least partially extended from the base portion) and may pull at the handle portion to move the handle portion to its actuating position (FIGS. 13 and 17) to cause extension 30 of base end 24 of handle portion 16 to engage and move or pivot actuating lever 20 to actuate the latch mechanism of the door to open the vehicle door. When the user releases the handle portion, the biasing element 56 at pivot pin 26 urges guide pin 32 back along guide surfaces 34*c* to move the handle back towards and to its initial or non-use position. At or around the same time, the actuator 18 functions to move or rotate the actuating element 50 back to its initial position so it no longer is acting against the guide pin 32 so that the guide pin is allowed to move back to its initial position via the urging or biasing of biasing element or torsional spring 56 (for example, the actuator motor 42 may operate in the reverse direction in response to a signal indicative of the handle portion being moved to its door opening position or in response to a user grasping the door handle or in response to expiration of a period of time following the triggering event that caused the actuator to move the handle to its ready position or the like). Likewise, the urging or biasing element 60 urges or moves actuating lever 20 back towards and to its initial position as the door handle 16 and extension 30 are moved back towards and to their initial or non-use positions.

Optionally, and desirably, a user may manually move the door handle to its ready position, such as for situations where the vehicle power is lost (such as when the vehicle battery is dead or the like) or where the user may not be carrying the key fob or the like. For example, the user may push at the base end 24 of the handle at the opposite side of the pivot pin 26 from the grasping portion 22, whereby the handle may pivot about pivot pin 26 to move towards its ready position. The spring force or return or biasing force of the biasing element 56 may be selected to provide a desired return force but not be so high as to be difficult for the user to overcome the spring force when manually moving the handle portion towards the ready position.

Thus, when normally mounted to a vehicle door and not in use, the door handle assembly of the present invention provides a generally flush mounted door handle that does not protrude from the side of the vehicle and/or does not have a pocket or recess thereat to facilitate grasping of the door handle by a person using the door handle to open the vehicle door. The actuator of the door handle assembly may cause the handle portion to extend from the vehicle when it is desired or appropriate for the user to grasp the door handle to open the vehicle door. Such movement of the door handle by the actuator may be in response to any suitable trigger or signal, such as in response to detection of a signal from a transmitting device or the like (such as a key fob or the like) that the user may carry, or such as in response to a detection of a proximity of a device that the user may carry (which is automatically detected when it is in a detectable distance from the vehicle and does not require that the user actuate a door unlock button or the like) or in response to other passive entry type systems and/or devices. Although shown and described as being movable by an electrically operable motor and actuator, the movement of the handle from its recessed position to its graspable position may be via any suitable means, such as an electric motor or a memory wire or muscle wire or the like.

By providing a flush or generally flush or recessed handle, the present invention reduces air drag and enhances the aerodynamic performance of the equipped vehicle with a potential for enhanced fuel economy for the vehicle. The extension of the handle from its recessed position to its partially extended or graspable position may be responsive to any suitable trigger or signal or the like. For example, the handle may extend to its graspable position responsive to a touch or proximity of a person's hand at the door handle or at the door or the like (such as via responsive to a touch or proximity sensor disposed at the vehicle door at or near the door handle). Optionally, the movement of the handle to its partially extended graspable position may be responsive to a signal received from a remote transmitting device, such as a key fob or identifying device or the like (and the signal may comprise a radio frequency signal or infrared signal or any suitable signaling means), or may be responsive to a human action at the door (such as a touch and/or proximity of a person or person's hand at the door or door handle).

Optionally, the movement of the door handle to its partially extended or graspable position may be done in conjunction with other functions, such as activation of one or more vehicle exterior lights (such as ground illumination lights or headlights or turn signal lights or the like) or such as activation of one or more vehicle interior lights or such as actuation of the vehicle horn or other signal to alert the user that the door handle is moved to its graspable position. The control circuitry or logic to provide the dual or multiple functions can piggyback on one common control system.

Optionally, the control circuitry or logic to control or extend the handle portion may include a lockout function so that the control will not and cannot extend the handle when it is not appropriate to open the door of the vehicle. For example, the lockout function may limit or preclude extension of the door handle when the vehicle is in a forward or reverse gear or when the vehicle ignition is on or following a period of time (such as about twenty seconds or more or less) after the vehicle ignition is turned on or when the vehicle is moving at or above a threshold speed (such as, for example, at or above about three mph or about five mph or other selected threshold vehicle speed) or the like. When one or more of these conditions (and optionally one or more other conditions depending on the particular application) is detected, the control limits or precludes extension of the handle to its graspable position irrespective of receipt of other inputs, such as a door unlock button actuation or a passive entry system signal or the like.

Figure 18:
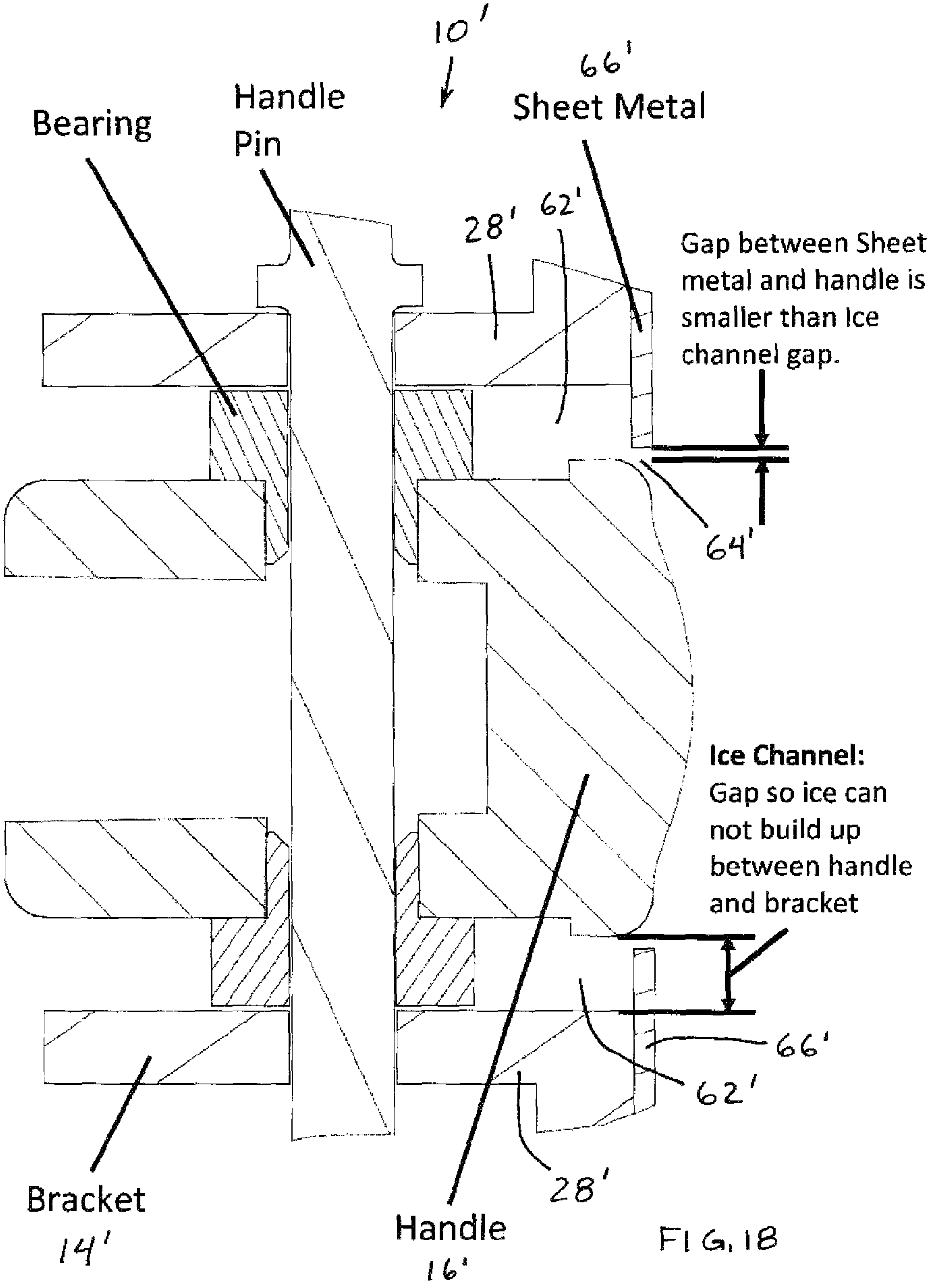
FIG. 18 is a sectional view of an extendable flush door handle assembly of the present invention, showing an ice channel or gap to reduce or limit or substantially preclude ice build up between the door handle and the bracket in accordance with the present invention.

Optionally, the door handle assembly may be disposed at a pocket or recess at the vehicle sheet metal or outer panel (such as a metal or plastic outer door or liftgate panel or the like) in a manner that reduced or limits or substantially precludes ice build up at the door handle, such as between the handle and the bracket. For example, and with reference to FIG. 18, an extendable flush door handle assembly 10' of the present invention may have a larger channel or gap or "ice channel" 62' formed or established between the side region or regions of the handle 16' and the side walls of the handle receiving portion 28' of the bracket or base portion 14', as compared to a narrower channel or gap 64' formed or established between the side region or regions of the handle 16' and the sheet metal 66' of the vehicle door or liftgate at which the handle assembly 10' is mounted. The smaller gap at the sheet metal limits water intrusion at the door handle and, with the larger channel inboard of the sheet metal and at and between the handle and the handle receiving pocket of the base portion, the build up or accumulation or formation of ice within the pocket is limited or reduced or substantially precluded. The gap between the handle and the sheet metal is thus smaller than the ice channel gap to limit or substantially preclude ice build up between the handle and the bracket or base portion. The handle assembly thus may be designed with an oversized pocket (the space where the handle fits into when its in it's flush state), which prohibits the build up of ice in the pocket and between the handle and the bracket or base portion.

Thus, the handle of the door handle assembly of the present invention extends out when the driver or user approaches the vehicle with a key fob or other signaling device or detectable device. The driver then can grab the handle and pull the handle to unlatch the door. The handle can then retract (back to a flush state) upon release of the handle by the user and optionally based on an input from a capacitive sensor (whereby the actuator and actuating element return to the initial position or setting). The handle can extend out either electrically and/or manually (such as for situations where there is power failure).

Optionally, the door handle assembly and/or the vehicle door may include a control or control module for operating and controlling the actuator (and/or other devices or functions of the door or vehicle). For example, the door or door handle assembly may include a control module that utilizes aspects of the control modules disclosed in U.S. patent application Ser. No. 12/499,183, filed Jul. 8, 2009, which is hereby incorporated herein by reference in its entirety.

Figure 19:
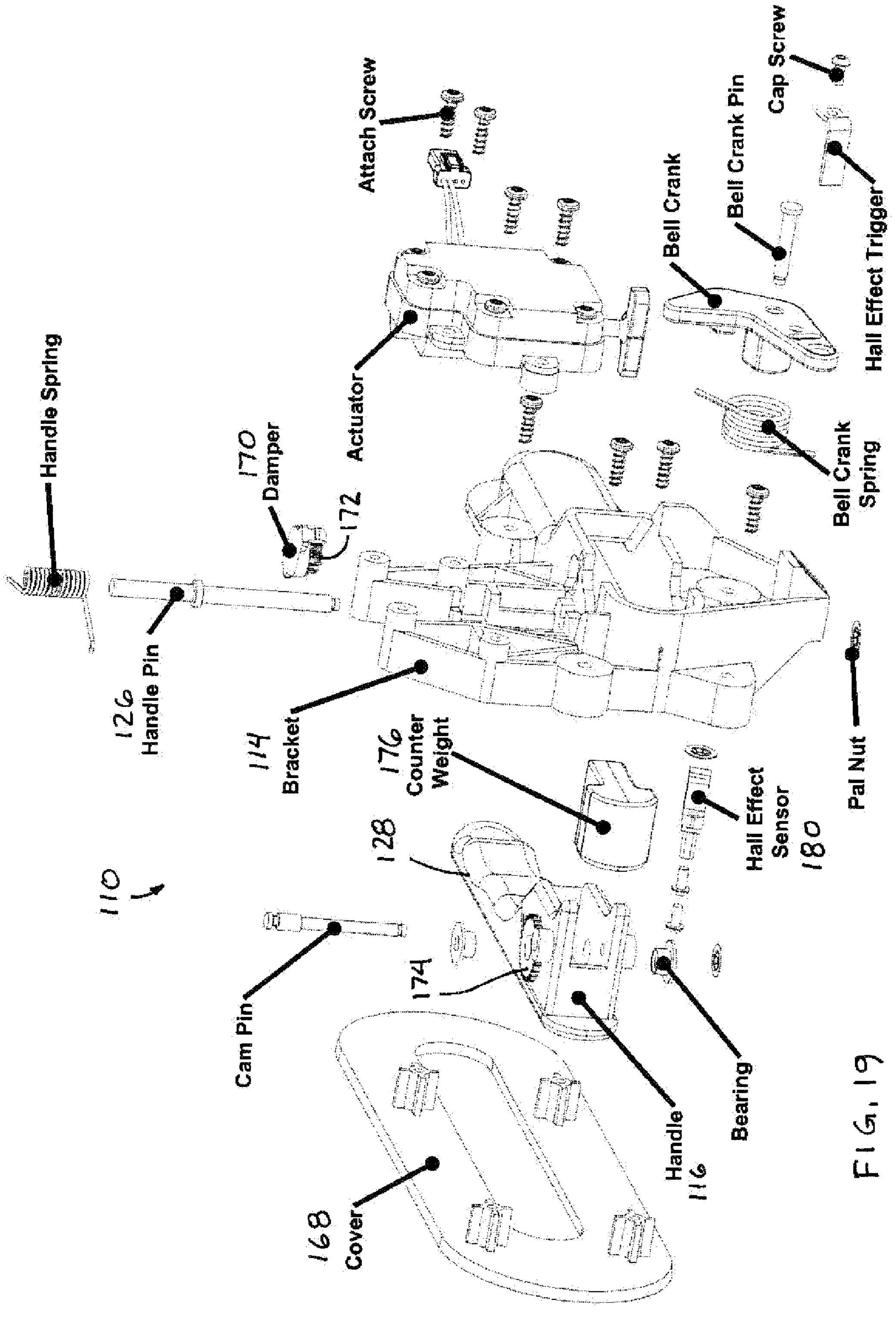
FIG. 19 is an exploded perspective view of another extendable flush door handle assembly in accordance with the present invention.

Optionally, and with reference to FIG. 19, a vehicular extendable flush door handle assembly 110 may include a handle 116 pivotally mounted at a base portion or bracket 114, which is mounted at a vehicle door or liftgate or the like. Handle assembly 110 includes a cover 168 that attaches to the base portion or bracket 114 and effectively sandwiches the vehicle sheet metal (not shown in FIG. 19) between the cover 168 and the outer surface of the bracket 114. Optionally, the handle assembly may include a wider or larger ice channel between the handle 116 and the walls of the handle receiving portion 128 of the base portion or bracket 114 as compared to a narrower or smaller gap between the handle 116 and the edges of the sheet metal and the cover, such as in a similar manner as discussed above with respect to FIG. 18. The handle assembly 110 may otherwise be similar (except as discussed below) to handle assembly 10, discussed above, such that a detailed discussion of the handle assemblies need not be repeated herein.

Optionally, and in the illustrated embodiment, handle assembly 110 may include a damper 170 that functions to dampen the return of the handle 116 to its flush position after the handle is pulled or actuated by the user to open the vehicle door. The damper may comprise any suitable kind of damper, such as a rotary damper 170 attached to a gear 172 as shown in FIG. 19. The gear 172 on the damper 170 contacts a free standing gear or gear feature 174 on the handle 116 to limit or control or dampen movement of the handle 116 about its handle pin or pivot pin 126 when the handle is released and moves back towards its flush position.

Optionally, and as also shown in FIG. 19, handle assembly 110 may include a counter weight 176 to offset the handle's inertia during a sudden acceleration or deceleration, such as may occur in a collision or crash of the vehicle. Optionally, an inertia catch device may also or otherwise be implemented, while remaining within the spirit and scope of the present invention. The counter weight and/or inertia catch may utilize aspects of the door handle assemblies described in U.S. patent application Ser. No. 12/577,272, filed Oct. 12, 2009, which is hereby incorporated herein by reference in its entirety.

Optionally, and as shown in FIG. 19, handle assembly 110 may include a sensor 180, such as a hall effect sensor or switch or capacitive sensor or the like. The sensor 180 functions to sense when the handle has been moved outwardly to open the vehicle door, whereby the actuator 118 may, responsive to such sensing (or a signal indicative of such sensing), reverse the cam to allow or move the handle to rotate back towards its flush position after the door has been opened and when the handle is released by the user. Optionally, the handle assembly or device may function to return the handle towards and to its flush position after a period of time has elapsed following opening of the door or when the vehicle ignition is turned on or the like. The handle thus may be automatically returned towards and to its flush position after a user pulls the handle to open the vehicle door or liftgate or the like.

Figure 20:
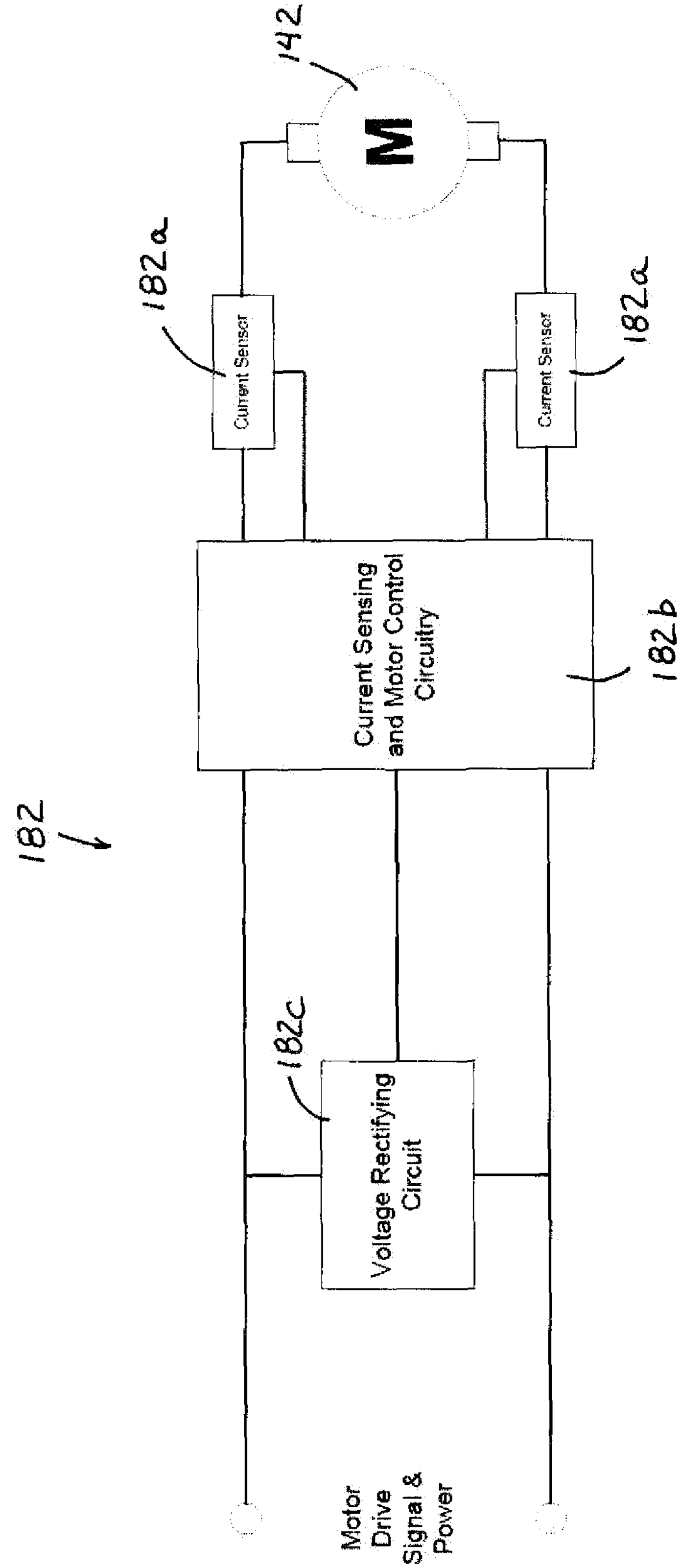
FIG. 20 is a schematic of an electronic shut off circuit suitable for use with the flush door handle assembly of the present invention.
Figure 21:
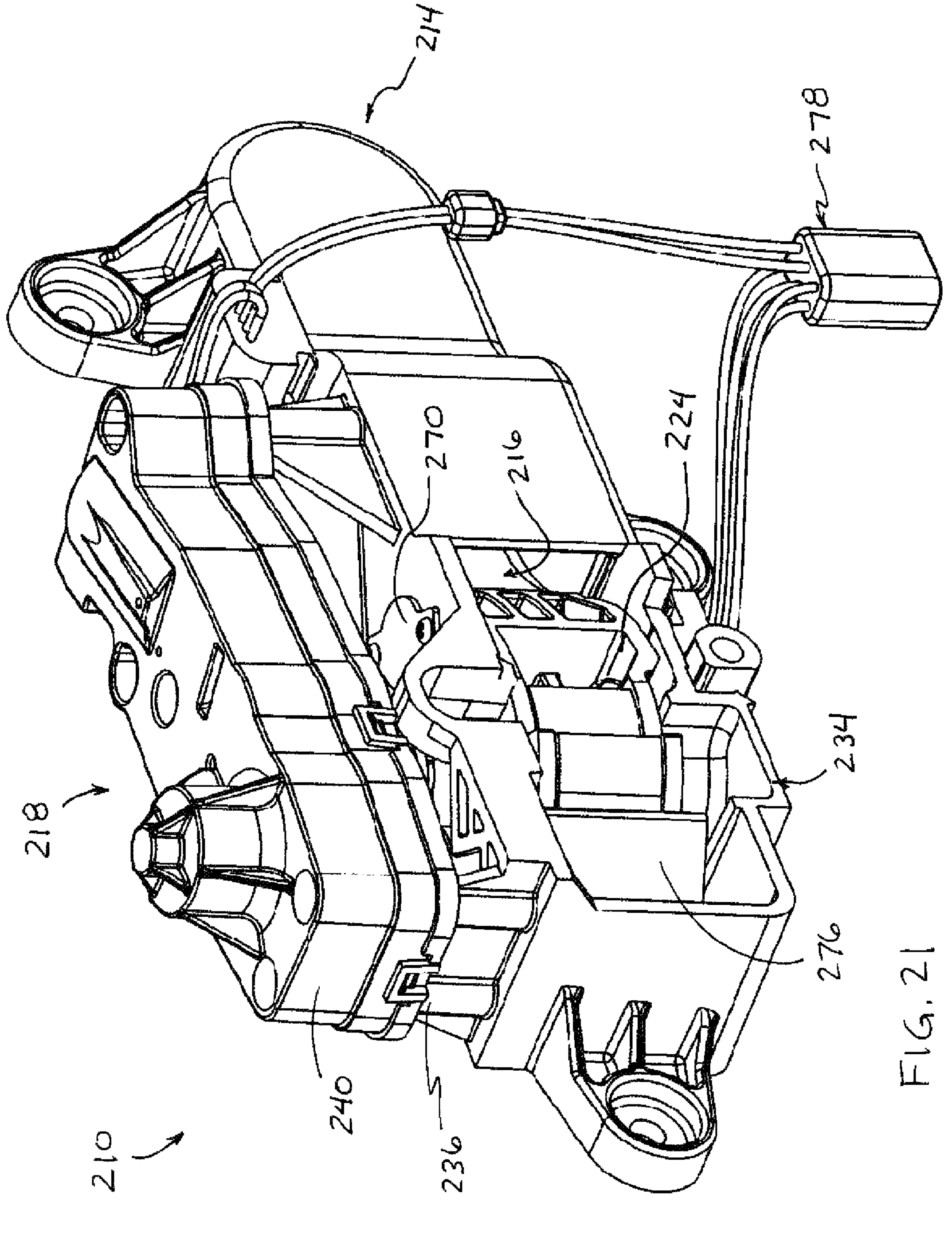
FIG. 21 is a perspective view of another extendable flush door handle assembly in accordance with the present invention.

Optionally, the actuator may be deactivated or stopped when the handle is moved to its fully retracted or flush state or position. For example, and with reference to FIG. 20, the actuator may be controlled by an electronic shut-off circuit 182, which deactivates or stops the actuator motor 142 when the motor attempts to draw a certain or threshold amount of current. Such an electronic shut-off circuit may be used to safely turn off the motor when the actuator is at its travel limits, whereby the motor may otherwise draw more current as a greater load is at the motor when the handle is at its travel limits and the motor continues to attempt to move the handle. Thus, upon detection of an increased or threshold current draw by the motor (such as via one or more current sensors 182*a* or other sensing means for sensing the handle approaching or reaching its travel limit or limits), the circuit 182 (which includes current sensing and motor control circuitry 182*b* and voltage rectifying circuitry 182*c*) may stop further action by the motor 142, such as by deactivating the motor. As shown in FIG. 20, the electronic shut-off circuit 182 is disposed between the motor 142 and the motor control (not shown in FIG. 20) that provides the motor drive signals and power to the motor during operation of the handle assembly of the present invention. The electronic shut-off circuit may be operable to deactivate the motor to stop movement of the handle at the handle's travel limits at the flush handle position and/or at the pulled or actuated handle position, while remaining within the spirit and scope of the present invention. Optionally, it is envisioned that such a motor shutoff feature or function (that would deactivate the actuator motor when the handle reaches or approaches its end of travel position or positions) may also or otherwise be achieved by the handle assembly of the present invention by use of one or more of (a) a current sensor circuit (such as discussed above), (b) a mechanical limit switch, (c) a stepper motor, (d) a potentiometer, (e) a hall effect sensor, (f) a commutator pulse detector, (g) a PTC (Positive Temperature Coefficient) sensor, and/or any other suitable sensor or mechanism that may determine when the handle is at or approaches its travel limit position or positions.

Optionally, and with reference to FIGS. 21-27, a vehicular extendable flush door handle assembly 210 may include a handle 216 pivotally mounted at a base portion or bracket or housing 214, which is mounted at a vehicle door or liftgate or the like. Handle assembly 210 may be similar (except as discussed below) to the handle assemblies discussed above, such that a detailed discussion of the handle assemblies need not be repeated herein. Briefly, handle assembly 210 includes an actuator 218 that operates to pivot the handle portion or handle 216 relative to base portion 214 (such as in response to a signal from a key fob or a passive entry system or the like) so that handle 216 is moved to a ready or use position where a user can grasp the handle portion to pull or move the handle portion for unlatching and/or opening the vehicle door and/or the like. In the illustrated embodiment, handle portion 216 includes an outer cover 217 that is attached to the handle (such as at least partially along the mounting portion 224 and the grasping portion 228 of the handle 216) to provide the desired outer appearance for the door handle assembly (such as a selected color or texture or appearance for the particular application of the handle assembly). Optionally, handle assembly 210 may include a cover that attaches to the base portion or bracket 214 and effectively sandwiches the vehicle sheet metal between the cover and the outer surface of the bracket 214, such as in a similar manner as discussed above.

Figure 22:
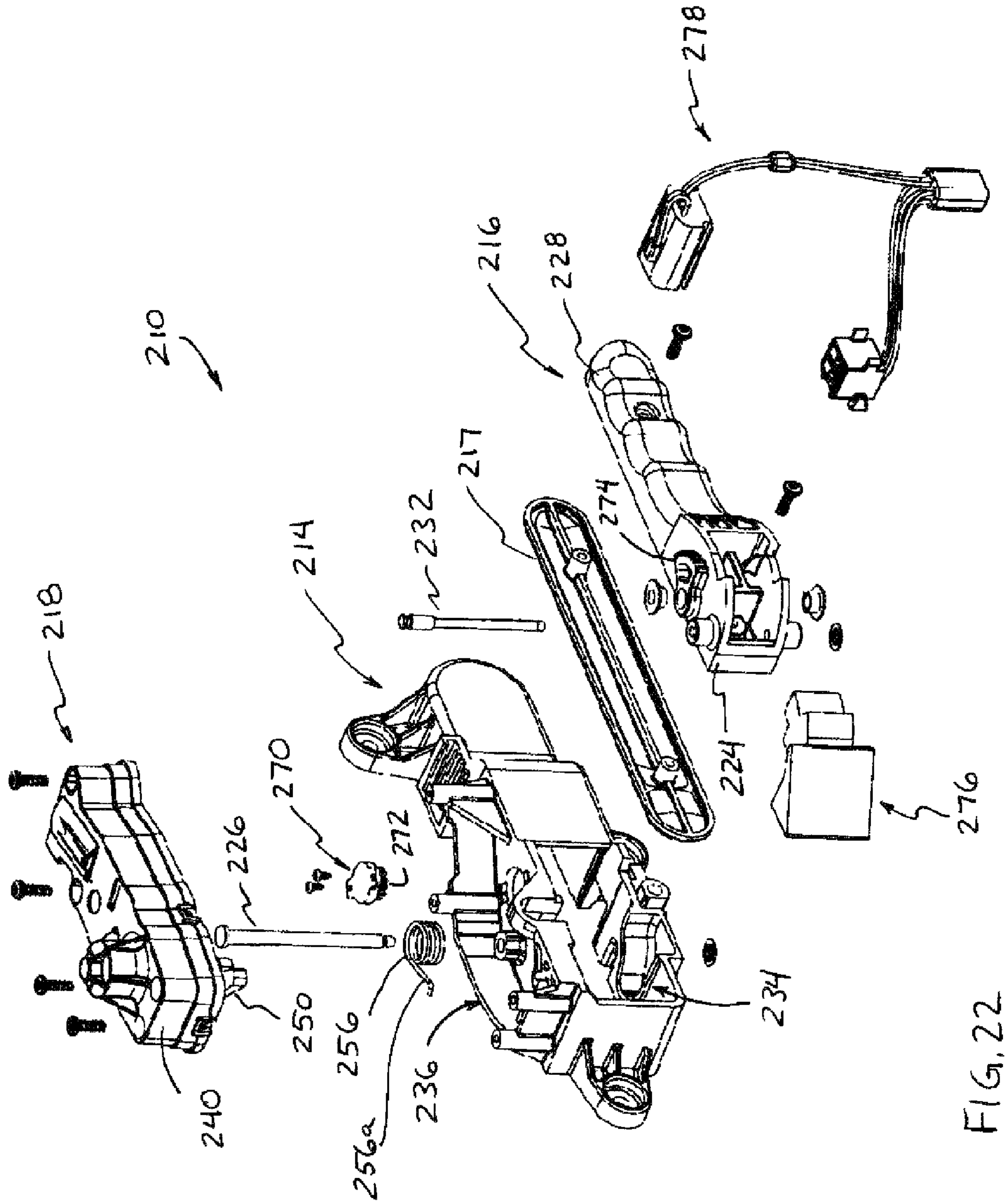
FIG. 22 is an exploded perspective view of the door handle assembly of FIG. 21.
Figure 23:
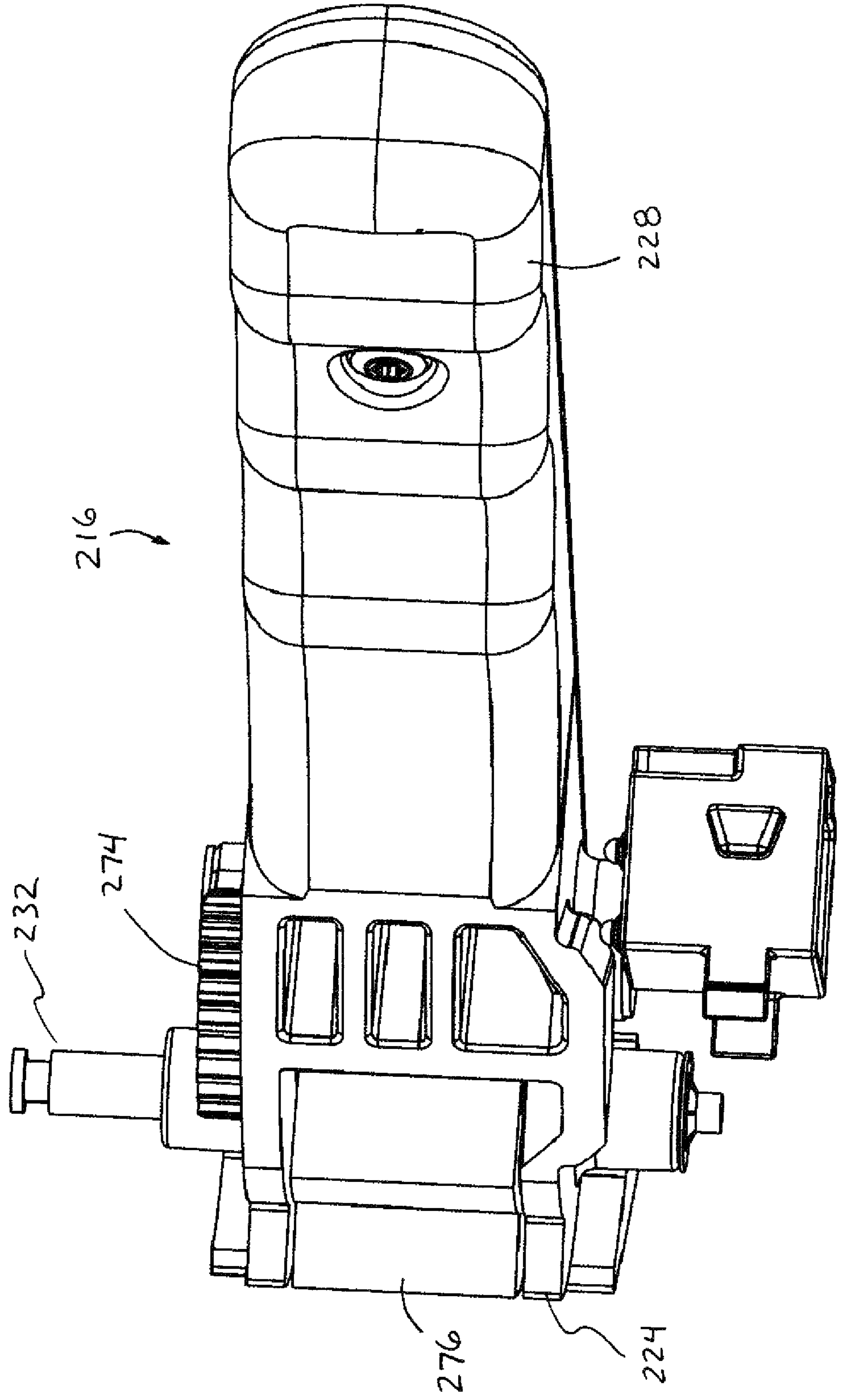
FIG. 23 is a perspective view of the handle portion of the door handle assembly of FIGS. 21 and 22.
Figure 24:
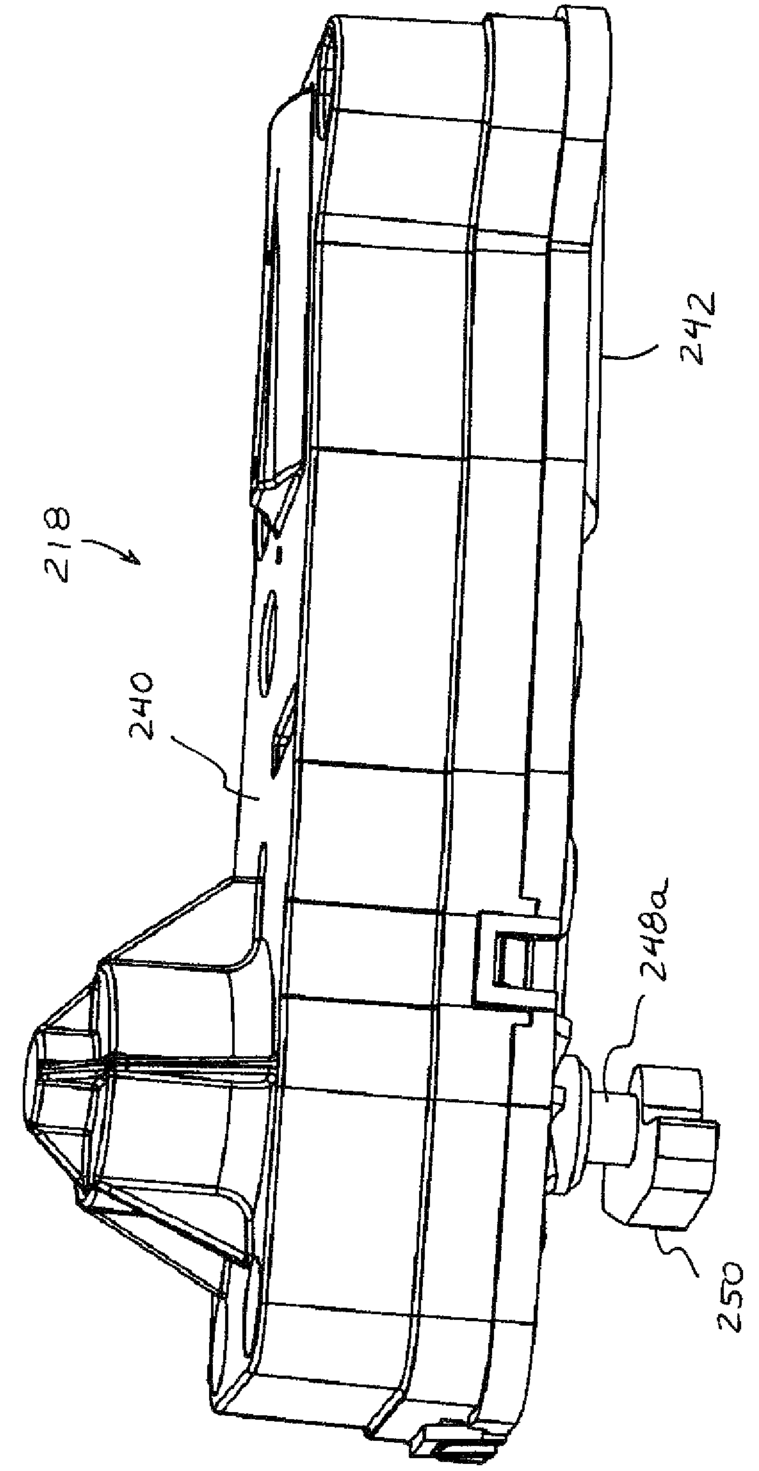
FIG. 24 is a perspective view of the motor or drive assembly of the door handle assembly of FIGS. 21 and 22.

Optionally, and in the illustrated embodiment, handle assembly 210 may include a damper 270 that functions to dampen the return of the handle 216 to its flush position after the handle is pulled or actuated by the user to open the vehicle door. The damper may comprise any suitable kind of damper, such as a rotary damper 270 attached to a gear 272 as shown in FIG. 22. The gear 272 on the damper 270 contacts a free standing gear or gear feature 274 on the handle 216 to limit or control or dampen movement of the handle 216 about its handle pin or pivot pin 226 when the handle is released and moves back towards its flush position. The actuator 218 and any illumination source or sources (or heater element or control circuitry or other electronic components or devices or accessories) may be electrically connected to a power source of the vehicle (such as to the vehicle battery or the like) and/or to control circuitry of the door assembly or the vehicle via a wiring harness 278.

Optionally, and as also shown in FIG. 22, handle assembly 210 may include a counter weight 276 to offset the handle's inertia during a sudden acceleration or deceleration, such as may occur in a collision or crash of the vehicle. Optionally, an inertia catch device may also or otherwise be implemented, while remaining within the spirit and scope of the present invention. The counter weight and/or inertia catch may utilize aspects of the door handle assemblies described in U.S. patent application Ser. No. 12/577,272, filed Oct. 12, 2009, which is hereby incorporated herein by reference in its entirety.

Figure 25:
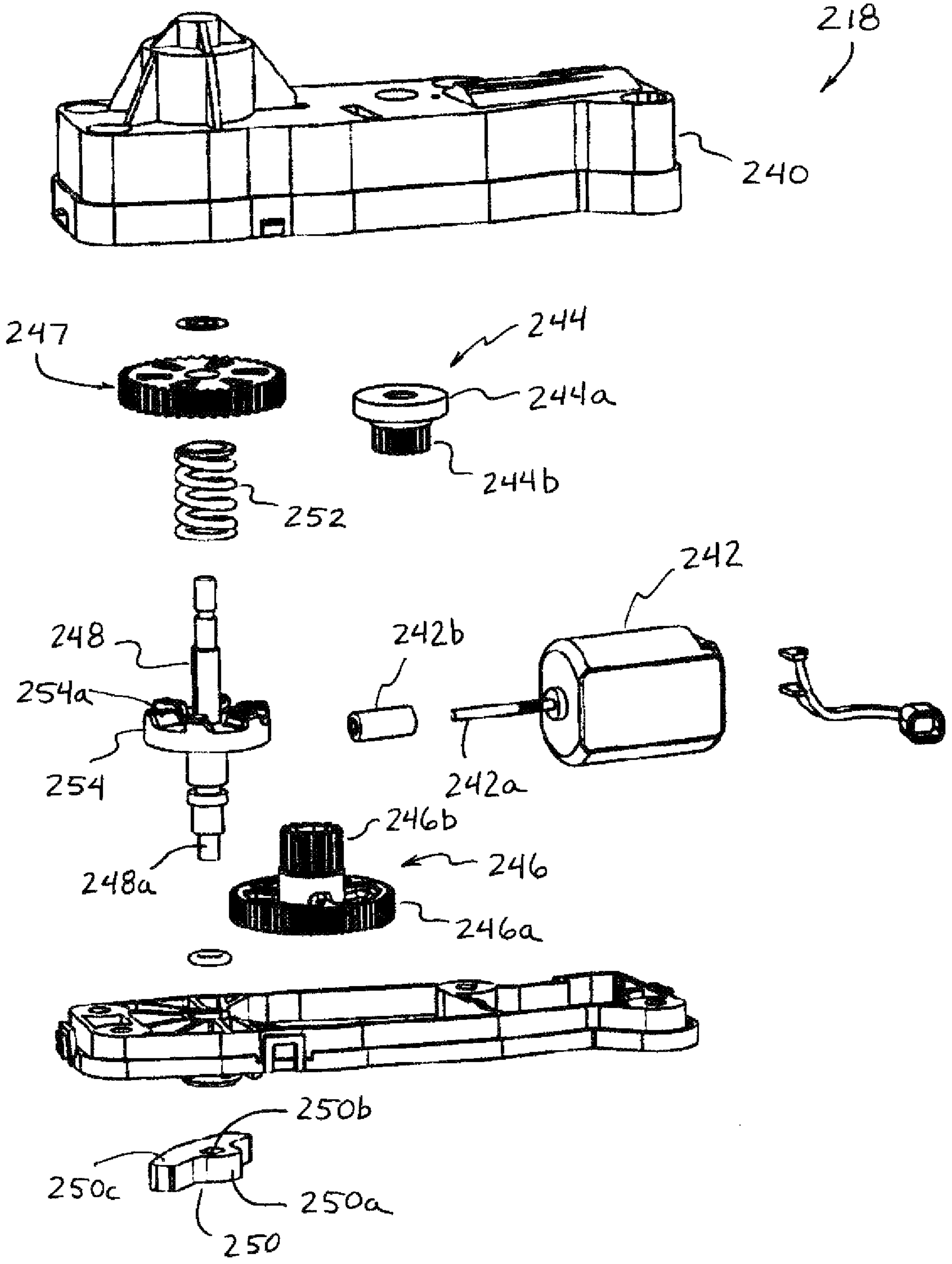
FIG. 25 is an exploded perspective view of the drive assembly of FIG. 24.
Figure 26:
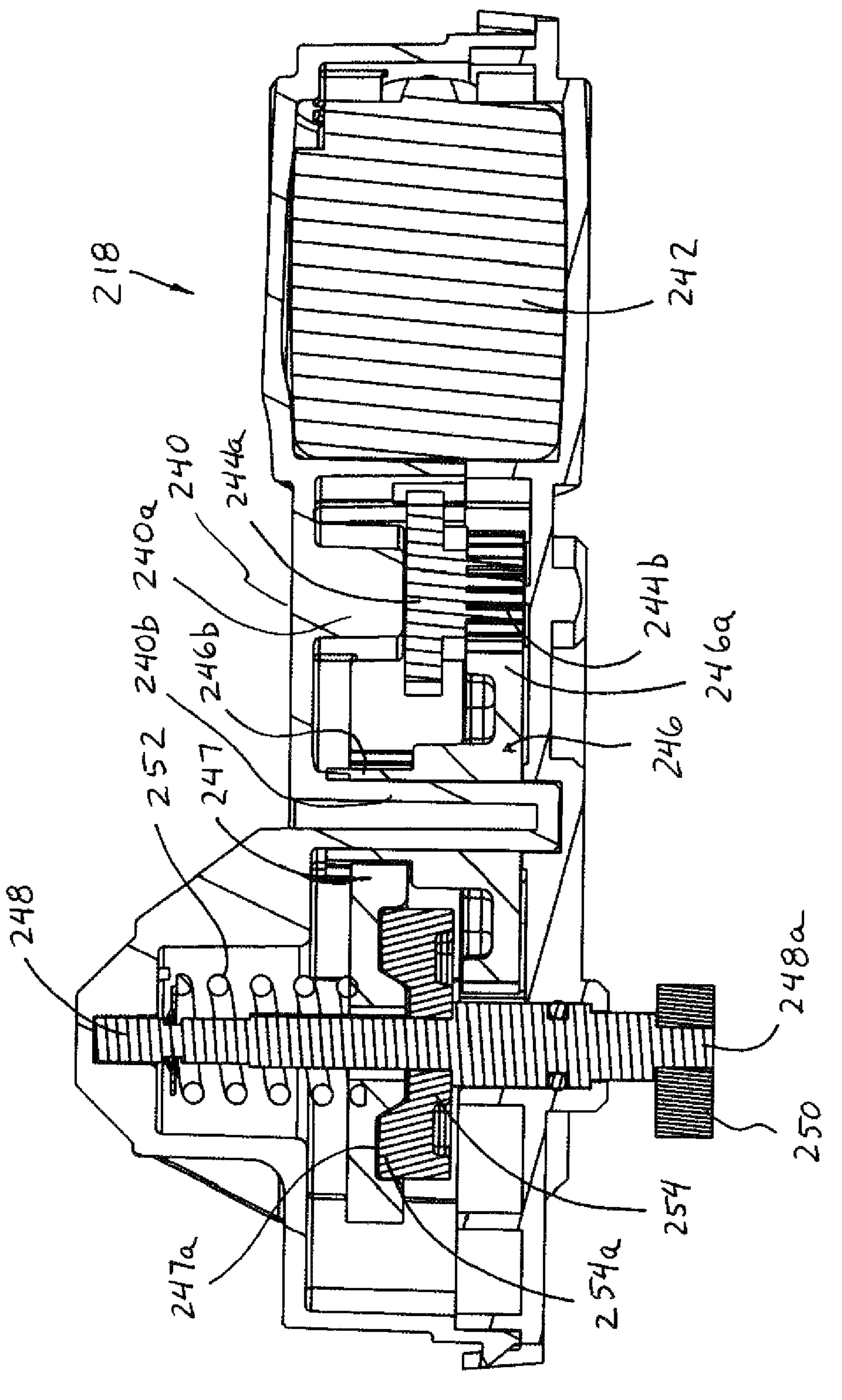
FIG. 26 is a sectional view of the drive assembly of FIG. 24.
Figure 27:
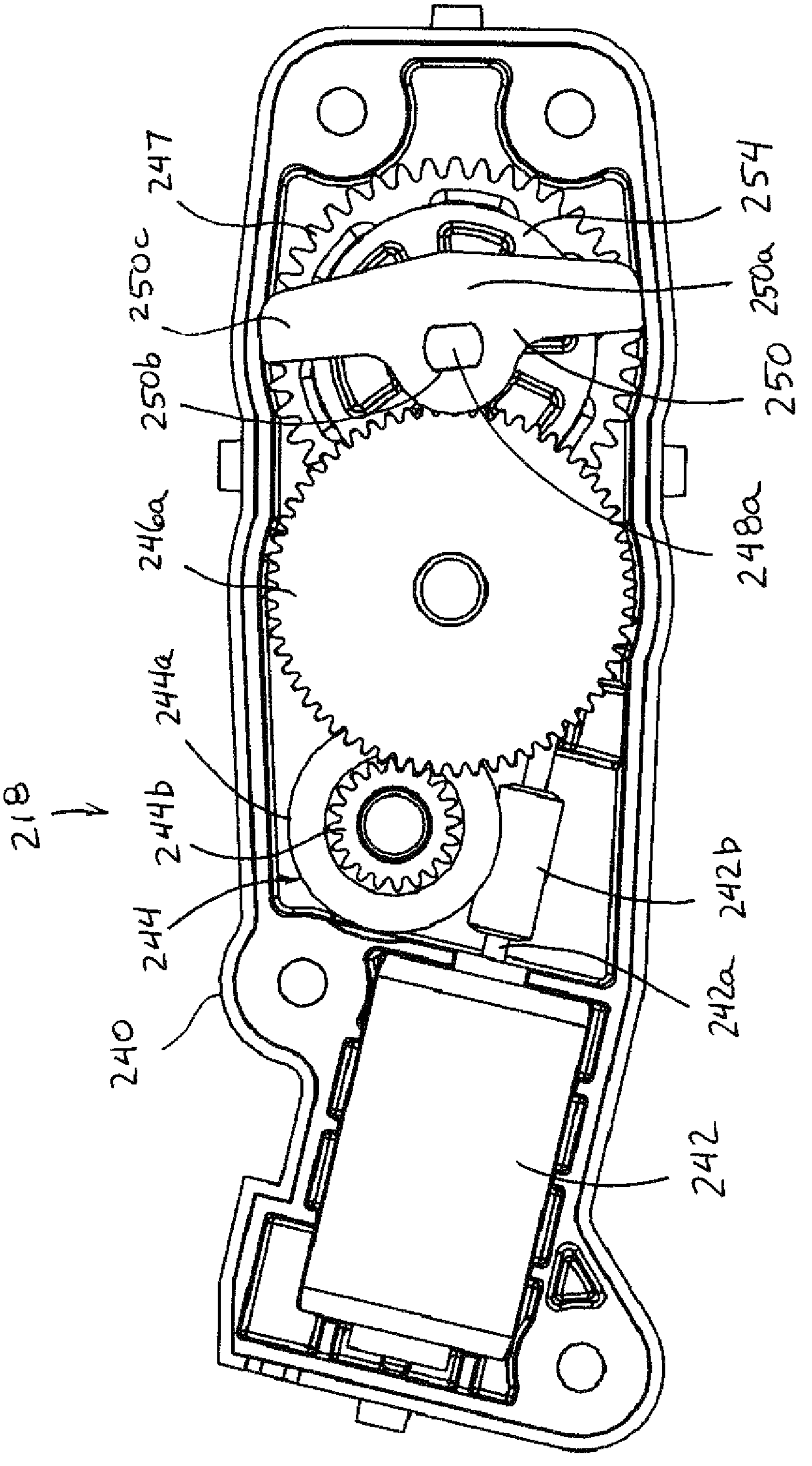
FIG. 27 is a plan view of the drive assembly of FIG. 24.

Actuator 218 is attached or fastened or secured to a mounting portion 236 of base portion 214 and comprises a housing or casing 240 that houses an electric motor 242 that is operable to rotate an output shaft 242*a* in either direction, such as in response to an actuating signal. Output shaft 242*a* is received in a gear element 242*b*, such as a worm gear or helical gear, that engages a gear member 244 (which may be rotatably mounted on an axle or protrusion 240*a* of the actuator housing 240, such as an axle that is integrally molded as part of the housing 240) that has a gear portion 244*a* for engaging gear 242*b* and a gear portion 244*b* for engaging a gear portion 246*a* of another gear element 246 (which may be rotatably mounted on an axle or protrusion 240*b* of the actuator housing 240, such as an axle that is integrally molded as part of the housing 240), which in turn has a gear portion 246*b* for engaging another gear element 247 that is disposed on an output shaft 248. Output shaft 248 is rotatably mounted to housing portion 240 and has a keyed end or engaging end or portion 248*a* that extends from housing 240 for engaging an actuating element 250, which is pivoted to engage and move the guide pin 232 to pivot the handle portion 216 about its pivot pin 226, such as in a similar manner as described above. A biasing element or spring 252 and an engaging or locking element 254 are disposed on output shaft 248 and spring 252 biases or urges or maintains gear element 247 against locking element 254 of output shaft 248 so that output shaft 248 rotates with gear element 246 when motor 242 is actuated. As can be seen in FIG. 25, locking element 254 has ramped teeth 254*a* that engage or are received in ramped notches 247*a* of gear element 247, such that, when gear element 247 is rotated in one direction, the stepped faces of the teeth 254*a* engage and drive against the stepped faces of the notches 247*a*, while, when gear element 247 or locking element 254 is rotated in the opposite direction, the ramped faces of the teeth 254*a* and notches 247*a* allow for disengagement or slippage of the gear element 247 and locking element 254, thereby allowing for manual movement of the handle portion 216.

Thus, when motor 242 is actuated to rotate output shaft 242*a*, the gears cooperate to impart a corresponding rotation of keyed end 248*a* of output shaft 248. Keyed end 248*a* is non-rotatably or fixedly received in actuating element 250 to rotate actuating element 250 in either direction. In the illustrated embodiment, actuating element 250 comprises a central portion 250*a* having an aperture 250*b* therethrough and actuating arms 250*c* extending radially outwardly from central portion 250*a*. Actuating arm 250*c* engages guide pin 232, which protrudes from base end 224 of handle portion 216, and, responsive to actuation of motor 242, imparts an arcuate movement of guide pin 232 along a guide portion of the base portion 214, which in turn imparts a pivotal movement of handle portion 216 about pivot pin 226.

In the illustrated embodiment, pivot pin 226 is received through the attaching walls and through base end 224 of handle portion 216. A biasing element 256 (such as a torsional spring or the like) is disposed at an end portion of the pivot pin and has an end 256*a* that engages guide pin 232 to bias or urge guide pin 232 towards an initial position and, thus, to bias or urge handle portion 216 towards its initial or non-use or flush or recessed position. When the actuator 218 is actuated to pivot actuating element 250 to move guide pin 232 along the guide portion of handle attaching portion 234, the guide pin 232 is moved against the biasing force of biasing element 256 to move the handle to its ready or partially extended or graspable position, where the handle portion 216 may approach or engage an actuating lever or arm (such as an actuating element that is connected to the door latch mechanism or the like), whereby further pivotal or pulling movement of the handle portion 216 (such as by a user grasping the grasping portion 228 of the handle and manually pulling the grasping portion outward away from the door) moves the actuating lever to actuate the door latch mechanism to open the vehicle door.

Optionally, the door handle assembly may include an antenna or the like, such as for sensing or transmitting signals, such as described in U.S. Pat. No. 6,977,619, which is hereby incorporated herein by reference in its entirety. For example, the handle assembly may include an antenna or sensor (such as an antenna and/or capacitive sensor) at the handle portion and/or may include a passive entry device or element. The antenna or sensor and/or passive entry device may receive a signal from a transmitting device (such as from a key fob or the like carried by the driver of the vehicle) and/or may sense or detect the presence of or proximity of a person or person's hand at or near the door handle, and may generate an output signal indicative of such detection. The actuator may be responsive to the antenna and/or sensor and/or device to impart an outward movement of the door handle portion so that the user can grasp the handle portion to open the door of the vehicle.

Figure 28:
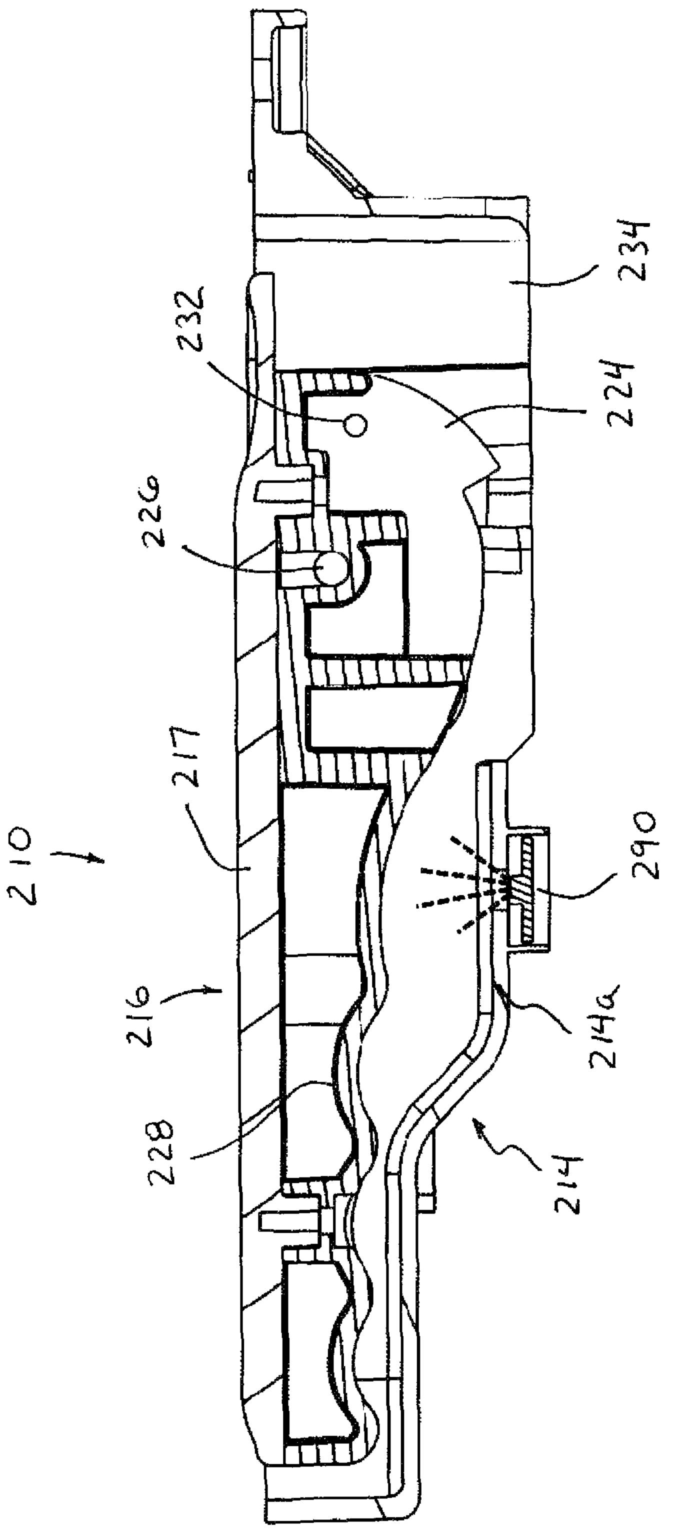
FIG. 28 is a sectional view of another extendable flush door handle assembly of the present invention, showing a pocket light for illuminating the pocket at which the handle portion is disposed.
Figure 29:
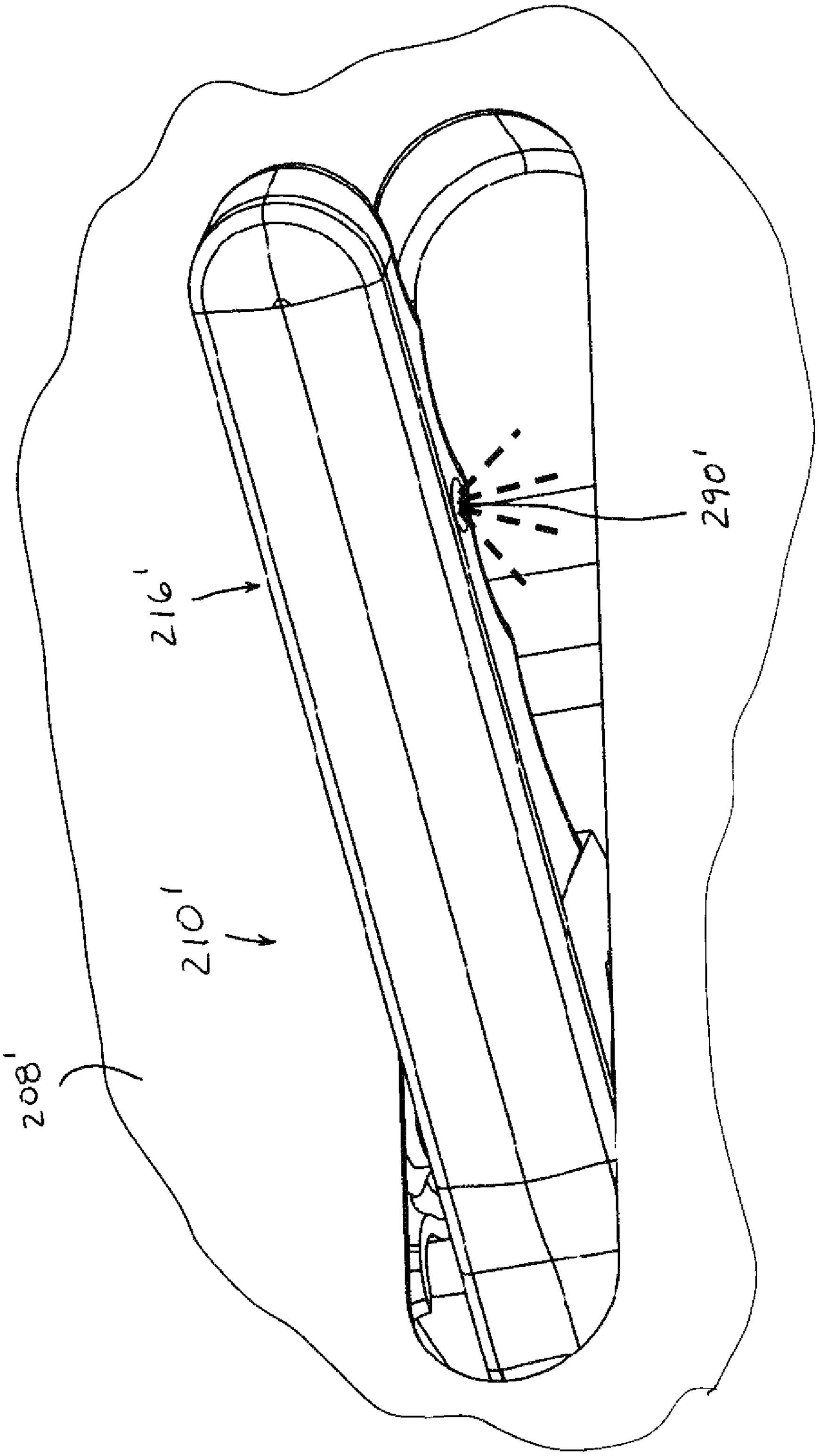
FIG. 29 is a perspective view of another extendable flush door handle assembly of the present invention, showing a light at the handle portion for illuminating an area at the door of the vehicle when the handle is moved toward its opened or extended position.
Figure 30:
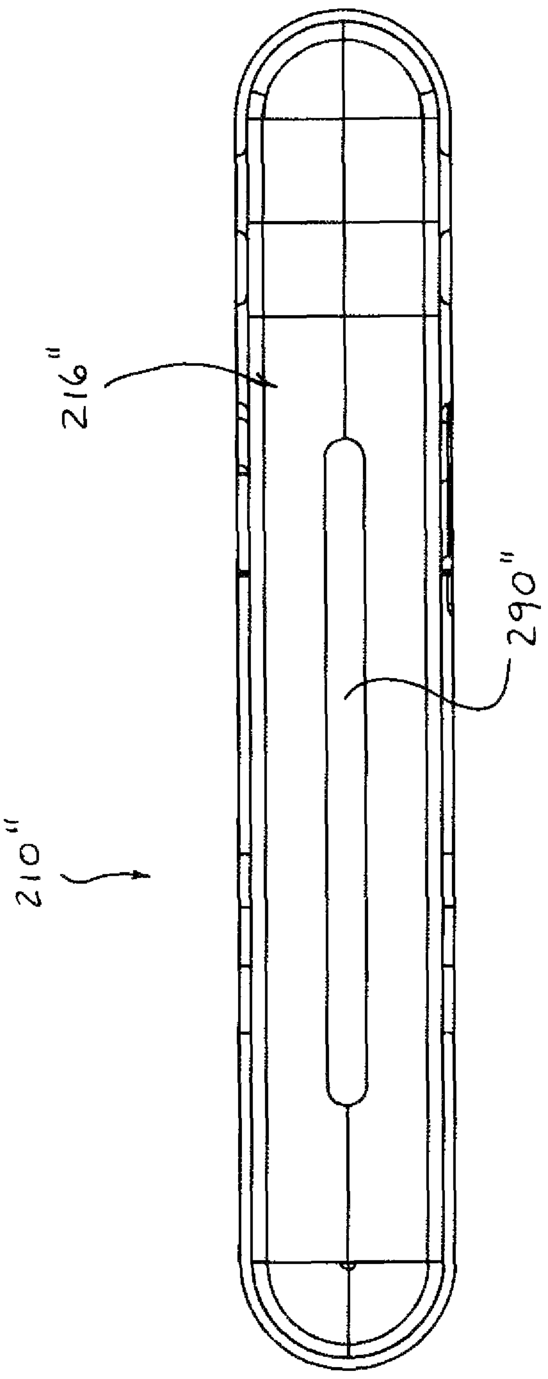
FIG. 30 is a side elevation of another extendable flush door handle assembly of the present invention, showing a handle portion with a light strip along the handle portion.
Figure 31:
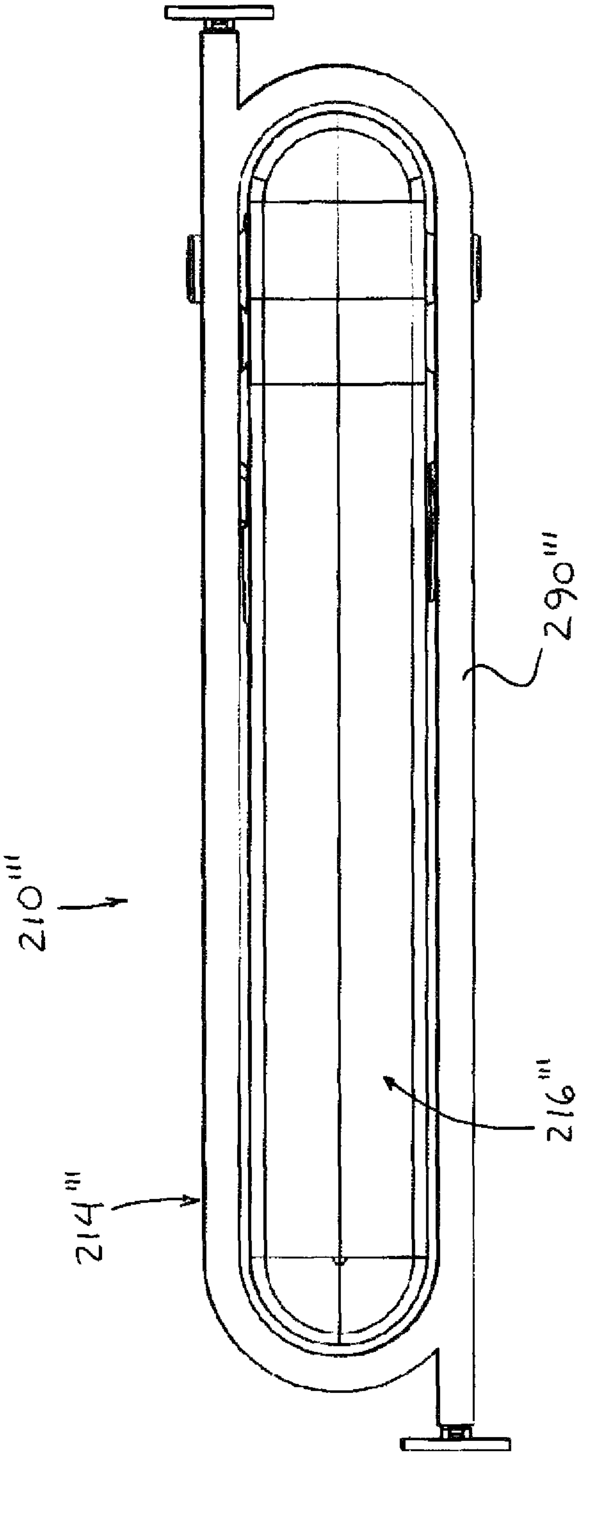
FIG. 31 is a side elevation of another extendable flush door handle assembly of the present invention, showing a handle portion with a light guide to produce an even light that fills the gap around the handle portion.

Optionally, the door handle assembly may include one or more illumination sources or light sources, such as for illuminating the pocket at which the handle portion is disposed or for illuminating or highlighting the handle portion. For example, and with reference to FIG. 28, the handle assembly 210 may include an illumination source 290 (such as one or more light emitting diodes or the like) disposed at a recessed portion 214*a* of the housing or bracket 214 within the pocket of the door handle assembly. The illumination source 290 may be activated responsive to the handle 216 being pivoted towards its use position (such as responsive to movement of the handle or responsive to the signal or trigger that causes the actuator to move the handle or responsive to other triggering means) so as to illuminate the pocket area and backlight the handle portion 216 so that the user can readily discern and grasp the handle portion in low lighting conditions. Optionally, and with reference to FIG. 29, a vehicular extendable flush door handle assembly 210' flush-mounted at a door panel 208' of a vehicle in accordance with the present invention may have include handle portion 216' that has an illumination source 290', whereby the illumination source 290' (such as one or more light emitting diodes or the like) may be activated responsive to the handle 216' being pivoted relative to its base portion 214' and towards its use or partially extended position (and optionally may be responsive to other suitable triggering means) and may, such as shown in FIG. 29, direct or emit light generally downwardly to illuminate the door of the vehicle and optionally a ground area adjacent the vehicle. Optionally, and with reference to FIG. 30, a door handle portion 216" of a vehicular extendable flush door handle assembly 210" of the present invention may include an illumination source or light strip 290" disposed along an outer surface of the handle portion 216". The light strip 290" provides illumination at least partially along the outer surface of the handle portion 216" and may be activated responsive to movement of the handle portion or responsive to a key fob or passive entry system or the like. Optionally, and with reference to FIG. 31, a base portion 214" of a vehicular extendable flush door handle assembly 210'" of the present invention may include a light strip or light pipe or light guide 290'" that circumscribes or at least partially surrounds the pocket and handle portion 216'" and is operable to produce generally uniform illumination that fills the gap around the handle portion. The light guide 290'" may be activated responsive to movement of the handle portion or responsive to a key fob or passive entry system or the like. Optionally, the door handle assembly may include an illumination module or lighting module for illuminating a portion of the door handle and/or the vehicle door or handle pocket region and/or the ground at or near the side of the vehicle, such as by utilizing aspects of the illumination modules described in PCT Application No. PCT/US08/062,347, filed May 2, 2008, which is hereby incorporated herein by reference in its entirety. The illumination module may be operable to provide ground illumination, pocket lighting, strip lighting or projection lighting or the like, such as described in PCT Application No. PCT/US08/062,347.

Figure 32:
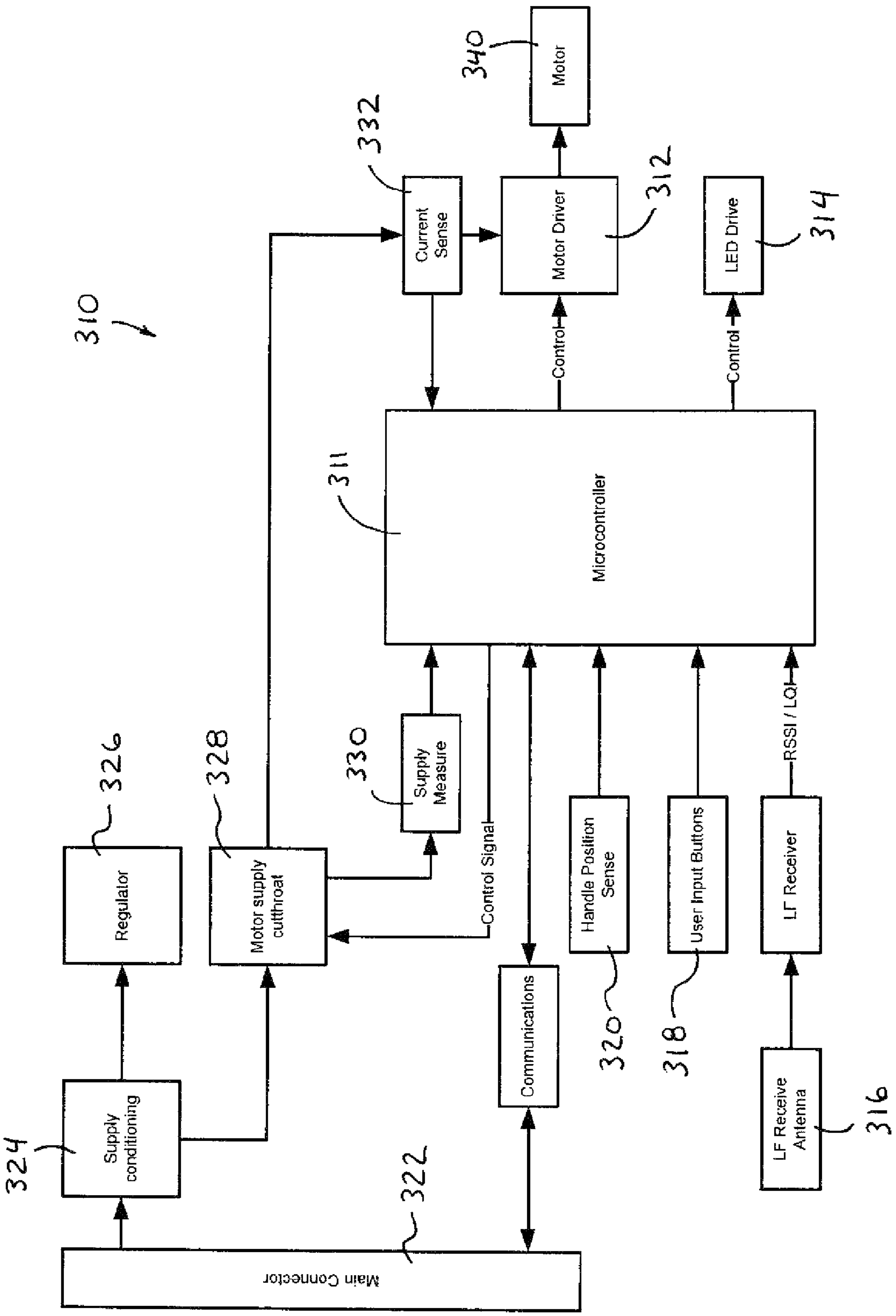
FIG. 32 is a schematic of an extendable flush door handle assembly and system in accordance with the present invention.

Thus, the extendable flush door handle assembly of the present invention may provide a flush handle portion that is generally flush with the outer surface of the door panel when the flush handle is in its retracted position, and the flush handle portion may be pivoted to an extended or use position where the handle portion protrudes partially outward away from the door panel so that a user can readily grasp the handle portion to open the vehicle door. As shown in FIG. 32, the door handle assembly may be controlled by a control system 310, which includes a microcontroller 311, which functions to control the motor driver 312 and motor 340 of the actuator (to cause the handle portion to move or pivot such as described above) and to control the illumination source or sources (such as via an LED drive 314 or the like). The controller 311 may be responsive to an antenna 316 that receives signals from a remote transmitter, such as a key fob or the like, and may be responsive to user input buttons or the like 318 and a handle position sensor 320, and the controller may, responsive to such signals, actuate or pivot the handle portion or block or preclude pivoting of the handle portion. The controller may be in communication with other controls or systems or devices, such as via a main connector 322, and such as by utilizing aspects of the communication system described in U.S. patent application Ser. No. 12/499,183, filed Jul. 8, 2009, which is hereby incorporated herein by reference in its entirety. The controller 311 may control the motor driver 312 as discussed above and the control system 310 may include a supply conditioning element or device 324, a regulator 326, a motor supply cutthroat 328, a supply measure 330 and a current sensor 332, and may control the motor driver and motor responsive to signals from such elements and sensors and devices.

The control circuitry that controls actuation of or pivoting of the door handle may operate responsive to user information and movement of the user, thereby providing a "smart" entry protocol. The control or control circuitry preferably may determine the point at which the handle is deployed. Preferably, the control may avoid deploying or extending the door handle or handles unnecessarily, which may become a nuisance. Thus, it is desired that the control process vector data and the like (such as data indicative of the movement of the user or driver or occupant of the vehicle, such as a person carrying a passive entry identifier or remote transmitting device or the like) to determine the intent of the driver or person approaching the vehicle, and if the control determines that the person is approaching the vehicle to open the door of the vehicle, the control may actuate the appropriate door handle so the person, upon arrival at the door, can grasp and actuate the extended door handle.

Figure 33:
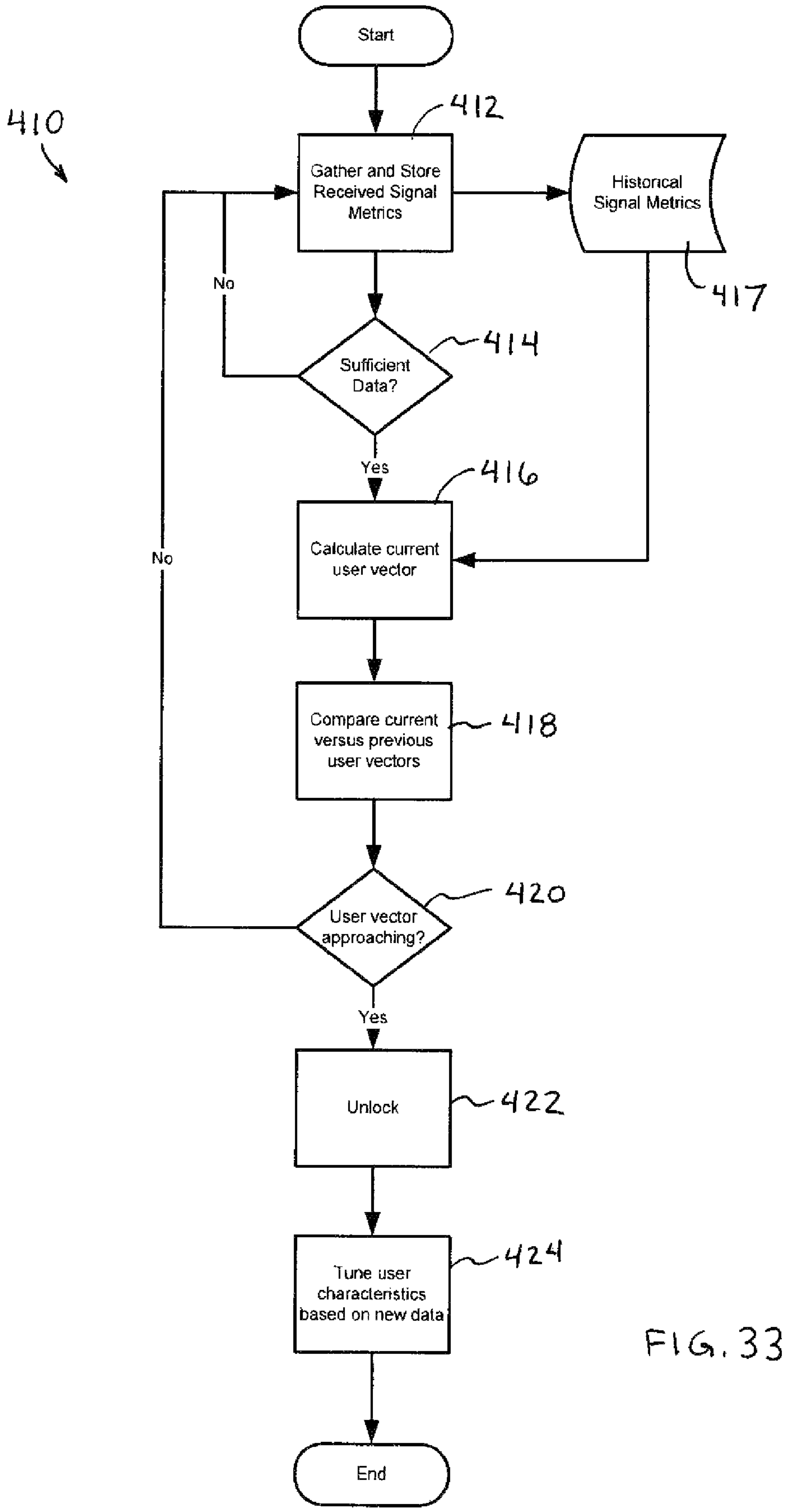
FIG. 33 is a flow chart of a smart entry process of the present invention.

For example, and with reference to FIG. 33, a smart entry process 410 of the control system may gather and store received signal metrics at 412 and, upon a determination at 414 that there is sufficient data stored, may calculate a vector of a current user at 416 (with such calculations optionally being based on historical signal metrics 417) and compare the current user vector versus previous user vectors at 418 to determine at 420 whether or not the user vector is approaching the vehicle door. If the system determines that the user vector is indicative of the user approaching the vehicle door, the system unlocks the door at 422 (and may move or pivot the handle portion outward so that the user may readily grasp the handle portion to open the vehicle door) and may tune the user characteristics based on new data at 424. If it is determined at 420 that the user vector is not indicative of the user approaching the vehicle door, then the system does not unlock the door and the process returns to continue gathering and storing received signal metrics at 412. Thus, the smart entry process of the present invention utilizes a transmitter and a receiver with a received signal strength indicator (RSSI) or a link quality indication (LQI). The RSSI provides a raw RF signal strength of a given carrier, and the LQI provides specific signal integrity data between two coupled devices. The direction of the user may be found using a mathematical algorithm based on the RF signal metrics RSSI and/or LQI. The system uses the previously characterized distance versus signal metrics as the basis of its calculations and calculates the user's vector from the received signal metrics. The system sequentially compares the user's vector to determine the approach path and may self-tune the user parameters based on historical data to improve the system performance.

Figure 34:
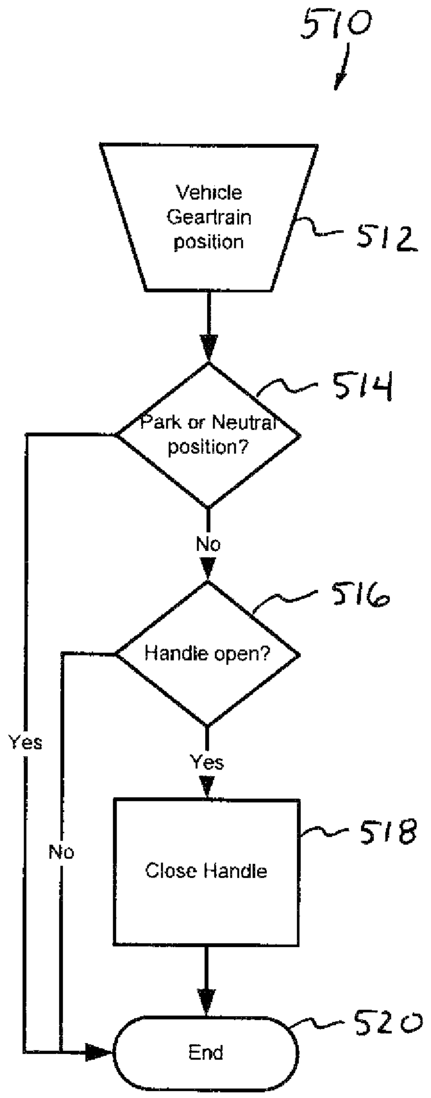
FIG. 34 is a flow chart showing a decision process for controlling the door handle responsive to a vehicle geartrain position in accordance with the present invention.

Optionally, the control or control system may have a lockout function and may operate to close the door handle to preclude opening of the door responsive to the gear selection or geartrain position of the vehicle. For example, and with reference to FIG. 34, a handle control process 510 of the present invention may, responsive to a vehicle geartrain position signal 512, determine at 514 whether the vehicle is in a park or neutral gear. If it is determined that the geartrain is not in a park or neutral position, the system determines at 516 whether or not the handle is in an open position. If it is then determined that the handle is in an open position, the system closes the handle at 518. If it is determined at 514 that the geartrain is not in a park or neutral position or if it is determined at 516 that the handle is not open, then the system does not close the handle and the process ends at 520. Thus, the system closes the handle to limit or substantially preclude opening of the door when the vehicle is not in park or in neutral and the handle is in an open position or orientation.

Figure 35:
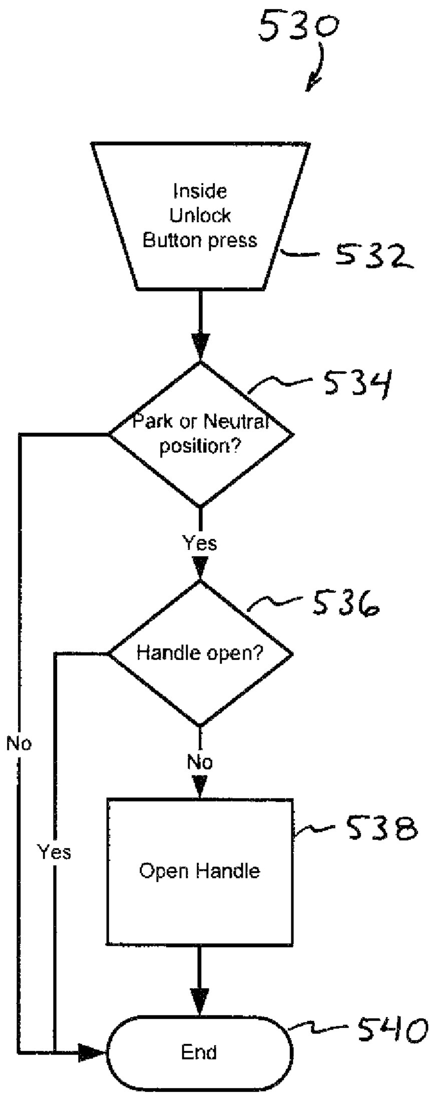
FIG. 35 is a flow chart showing a decision process for controlling the door handle responsive to actuation of a door lock/unlock button inside the vehicle in accordance with the present invention.

Optionally, the control system may pivot the handle to its open position responsive to various inputs or determinations. For example, and with reference to FIG. 35, a handle control process 530, responsive to a signal 532 that is indicative of an inside door unlock button being actuated, determines at 534 whether the vehicle is in a park or neutral gear. If it is determined that the geartrain is in a park or neutral position, the system determines at 536 whether or not the handle is in an open position. If it is determined that the handle is in its closed position, the system opens or pivots or extends the handle at 538. If it is determined at 534 that the vehicle is not in park or neutral, the control system has a lockout function that operates to not pivot or open the handle when the vehicle is in a forward or reverse gear. Also, if it is determined at 534 that the vehicle is not in park or neutral, or it is determined at 536 that the handle is open, then the system does not open the handle and the process ends at 540. Thus, the system pivots the handle to its open or use position when a person within the vehicle actuates a door unlock button in the vehicle and when the vehicle is in park or neutral.

Figure 36:
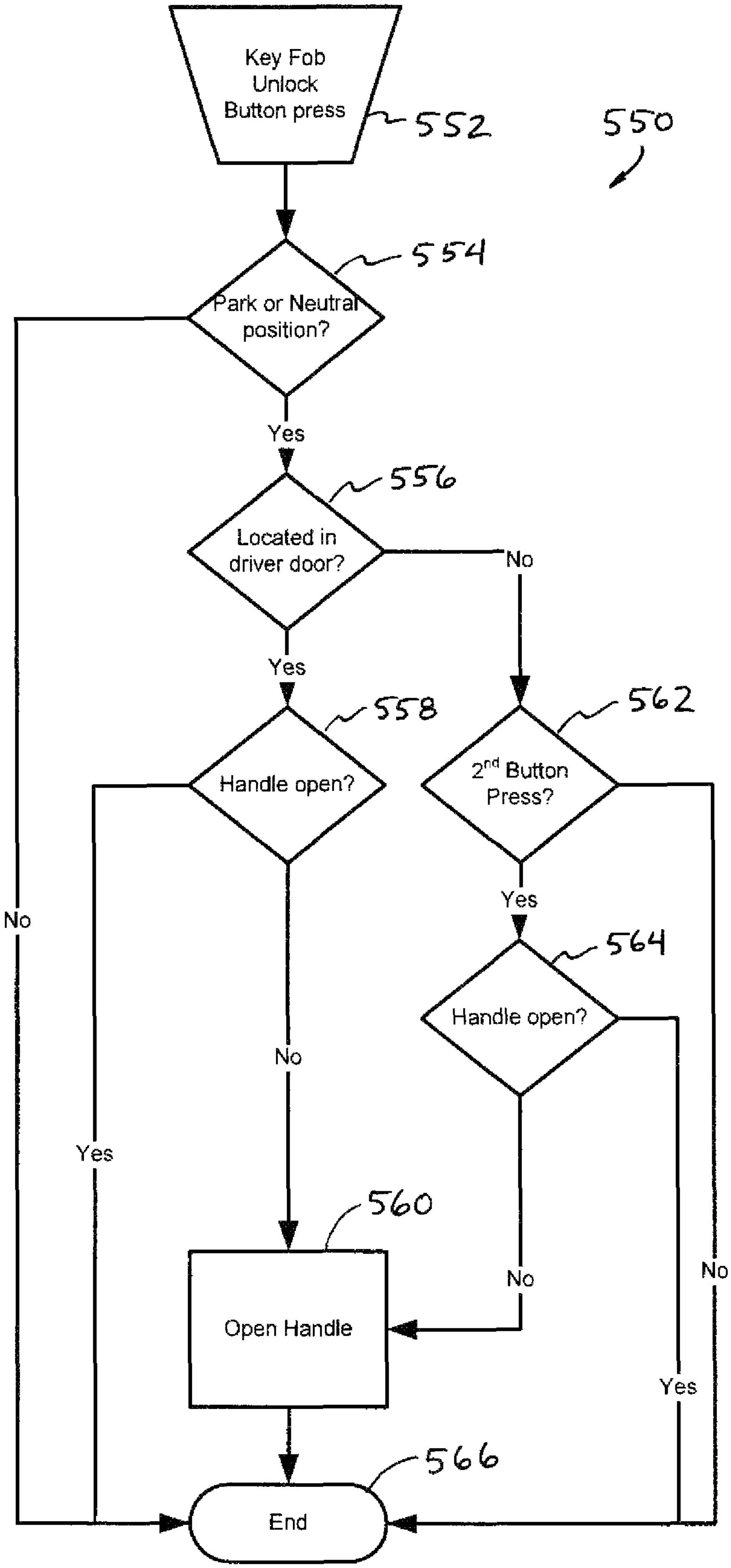
FIG. 36 is a flow chart showing a decision process for controlling the door handle responsive to actuation of a key fob in accordance with the present invention.

Similarly, the control system may open the handle responsive to actuation of a remote transmitter or key fob or the like. For example, and with reference to FIG. 36, a handle control process 550, responsive to a signal 552 that is indicative of a key fob unlock button being actuated, determines at 554 whether the vehicle is in a park or neutral gear. If it is determined that the geartrain is in a park or neutral position, the system determines at 556 whether or not the actuation was for a driver side door handle and, if it is determined that the actuation was for the driver side door handle, then the system determines at 558 whether or not the handle is in an open position. If it is determined that the handle is in its closed position, the system opens or pivots or extends the handle at 560. Also, if it is determined at 556 that the actuation was not for the driver door, then it is determined at 562 whether or not a second button of the key fob was pressed, and if it is determined that the second button was pressed, then the system determines at 564 whether or not the handle is in an open position. If it is determined that the handle is in its closed position, the system opens or pivots or extends the handle at 560. If it is determined at 554 that the vehicle is not in park or neutral, the control system has a lockout function that operates to not pivot or open the handle when the vehicle is in a forward or reverse gear. Also, if it is determined at 554 that the vehicle is not in park or neutral, or if it is determined at 558 o564 that the handle is open, or if it determined at 562 that the second button was not pressed, then the process ends at 566. Thus, the system pivots the handle to its open or use position when a person actuates a door unlock button of a key fob and when the vehicle is in park or neutral.

Optionally, the extendable flush door handle assembly of the present invention may provide an energy generating feature. For example, the handle can act as a generator to create energy for the use of powering emergency devices (such as, for example, an electric latch, lighting, and/or the like) on a vehicle when the vehicle battery is low in power. By using an actuator with a back drivable gear train, the user could cycle the handle manually and generate power by rotating a motor. Other power generation methods could include, but are not limited to, power savaging, induction coils, Piezo electric materials, a pre-charged capacitor, Peltier devices, and/or power transfer from external devices. The generated power can be stored in one or more batteries or capacitors disposed at the vehicle door or in the vehicle.

Optionally, the extendable flush door handle assembly of the present invention may provide a reverse gear drive. For example, the actuator can use a reversible gear drive so that the handle movement can be reversed without harming the actuator. This would be done by using back drivable gears, such as worm gears, spur gears, helical gears or the like. The cam gear could be eliminated so that the handle is directly tied to the actuator.

Optionally, the extendable flush door handle assembly of the present invention may provide one or more bumpers, which can be used to reduce the sound that the handle makes while returning to its closed or flush position. The bumpers can be placed to maintain the gap between the handle and the sheet metal of the vehicle door when the handle is in its flush position.

Although shown and described as being a generally horizontally oriented handle portion that pivots about a generally vertical pivot axis, it is envisioned that the handle of the extendable flush door handle assembly may be oriented in any manner while remaining within the spirit and scope of the present invention. For example, the handle may be oriented so that it is either vertical, horizontal, or diagonal with respect to the ground. Also, although shown and described as an exterior door handle for opening a side door or rear door or lift gate of a vehicle from exterior the vehicle, it is envisioned that the extendable flush door handle assembly may be suitable for use as an interior handle for opening a side door or rear door or liftgate of a vehicle from inside the vehicle, while remaining within the spirit and scope of the present invention.

Optionally, the door handle assembly or module may incorporate other features or accessories, such as, for example, a blind spot indicator device or element and/or a turn signal indicator device or element, such as by utilizing aspects of the devices described in U.S. patent application Ser. No. 12/187,725, filed Aug. 7, 2008; Ser. No. 12/264,669, filed Nov. 4, 2008; Ser. No. 12/446,507, filed Apr. 21, 2009, and/or U.S. Pat. Nos. 7,492,281; 6,198,409; 5,929,786; and 5,786,772, and/or PCT Application No. PCT/US07/82099, filed Oct. 22, 2007, which are hereby incorporated herein by reference in their entireties. The signal indicator or indication module may include or utilize aspects of various light modules or systems or devices, such as the types described in U.S. Pat. Nos. 7,581,859; 6,227,689; 6,582,109; 5,371,659; 5,497,306; 5,669,699; 5,823,654; 6,176,602; and/or 6,276,821, and/or PCT Application No. PCT/US2006/018567, filed May 16, 2006 and published Nov. 23, 2006 as International Publication No. WO 2006/124682, which are hereby incorporated herein by reference in their entireties.

Optionally, the door handle assembly or module may include or may be associated with an antenna for receiving signals from or communicating with a remote device. For example, the antenna (such as, for example, an antenna of the types described in U.S. Pat. No. 6,977,619, which is hereby incorporated herein by reference in its entirety) may communicate a signal to the door locking system via a wire connection or the like, or wirelessly, such as via a radio frequency signal or via an infrared signal or via other wireless signaling means. Such connections can include cables, wires, fiber optic cables or the like. The communication to the locking system may be via a vehicle bus or multiplex system, such as a LIN (Local Interconnect Network) or CAN (Car or Controlled Area Network) system, such as described in U.S. Pat. Nos. 6,291,905; 6,396,408; and/or 6,477,464, which are all hereby incorporated herein by reference in their entireties. The vehicle door may then be unlocked and/or the illumination source or sources may be activated as a person carrying a remote signaling device approaches the door handle. Optionally, other systems may be activated in response to the remote signaling device, such as vehicle lighting systems, such as interior lights, security lights or the like (such as security lights of the types disclosed in U.S. Pat. Nos. 6,280,069; 6,276,821; 6,176,602; 6,152,590; 6,149,287; 6,139,172; 6,086,229; 5,938,321; 5,671,996; 5,497,305; 6,416,208; and/or 6,568,839, all of which are hereby incorporated herein by reference in their entireties), or the vehicle ignition, or any other desired system, while remaining within the spirit and scope of the present invention.

Changes and modifications to the specifically described embodiments may be carried out without departing from the principles of the present invention, which is intended to be limited only by the scope of the appended claims as interpreted according to the principles of patent law.

The embodiments of the invention in which an exclusive property or privilege is claimed are defined as follows:

1. A handle assembly for a door of a vehicle, said handle assembly comprising:

- a base portion mounted at or incorporated into a structure of the door of the vehicle;
- a handle portion movable relative to said base portion, wherein said handle portion is movable between a recessed position, where said handle portion is at least partially recessed at said base portion so as to be not readily graspable by a user, and a partially extended position, where said handle portion extends partially outward from said base portion to be graspable by the user;
- wherein, when said handle portion is at said partially extended position, said handle portion is manually movable further outward from said base portion to open the door of the vehicle;
- a control operable to move said handle portion from said recessed position to said partially extended position responsive to a trigger;
- wherein said control operates a motor of an actuator of said handle assembly and wherein operation of said motor moves said handle portion between said recessed position and said partially extended position;
- wherein said control controls said actuator to move said handle portion from said recessed position to said partially extended position responsive to said trigger;
- wherein said actuator engages a guide element of said handle portion to move said guide element in a generally arcuate path to impart pivotal movement of said handle portion about a pivot pin that pivotally mounts said handle portion to said base portion;
- wherein said actuator comprises a clutch that provides a manual override that allows the user to manually move said handle portion relative to said base portion;
- wherein said clutch comprises a first gear element that is driven by said motor and a second gear element that is driven by said first gear element; and
- wherein, when said handle portion is moved toward said partially extended position via operation of said motor of said actuator and when said partially extended handle portion is manually urged toward said recessed position, said second gear element slips relative to said first gear element to allow said partially extended handle portion to be manually moved toward said recessed position.

2. The handle assembly of claim 1, wherein said handle assembly is mounted at a structure of one of (a) a side door of the vehicle, (b) a rear door of the vehicle and (c) a liftgate of the vehicle.

3. The handle assembly of claim 1, wherein said trigger comprises at least one of (a) a signal from a passive entry device, (b) a signal from a remote transmitting device and (c) a signal indicative of the user actuating a door unlock button of the vehicle.

4. The handle assembly of claim 1, wherein said actuator comprises an electrically operable actuator.

5. The handle assembly of claim 1, wherein said handle portion is pivotally mounted to said base portion and said actuator is operable to pivot said handle portion from said recessed position to said partially extended position.

6. The handle assembly of claim 1, wherein said control is responsive to a passive entry system of the vehicle, and wherein said trigger comprises a signal of said passive entry system.

7. The handle assembly of claim 1, wherein said control is operable in response to current sensing circuitry to stop movement of said handle portion when said handle portion reaches its travel limits at at least one of its recessed position and said partially extended position.

8. The handle assembly of claim 1, wherein said handle portion, when in said recessed position, is at least partially received in said base portion so as to be not readily graspable by the user until said handle portion is moved toward said partially extended position.

9. The handle assembly of claim 1, wherein said base portion includes a bezel portion that is generally flush with an exterior surface of the vehicle door when said handle assembly is mounted to the vehicle door, and wherein a handle outer surface is generally flush or generally coplanar with or protrudes slightly outward from an exterior surface of said bezel portion when said handle portion is in said recessed position.

10. The handle assembly of claim 1, wherein a grasping portion of said handle portion is received in said base portion when said handle portion is in said recessed position, and wherein said grasping portion is not readily graspable by the user when said handle portion is in said recessed position.

11. The handle assembly of claim 1, wherein when said handle assembly is mounted at an opening in sheet metal of a vehicle, a gap between said handle portion and the sheet metal is less than a gap between said handle portion and a handle receiving portion of said base portion.

12. The handle assembly of claim 1, further comprising a cover element that functions to sandwich the vehicle sheet metal between said cover element and said base portion when said handle assembly is mounted at the sheet metal of the vehicle.

13. The handle assembly of claim 1, further comprising a dampening element that dampens return of said handle portion towards its recessed position after extension of said handle portion to open the vehicle door.

14. The handle assembly of claim 1, wherein said handle assembly comprises one of (a) a strap handle assembly for opening a side door of a vehicle, (b) a paddle handle assembly for opening a side door of a vehicle and (c) a liftgate handle assembly for opening a liftgate of a vehicle.

15. The handle assembly of claim 1, wherein, responsive to determination of a lockout condition, said control limits movement of said handle portion from said recessed position towards said partially extended position, and wherein said lockout condition comprises at least one of (i) the vehicle being in a forward gear, (ii) the vehicle being in a reverse gear, (iii) the vehicle ignition being on, (iv) a predetermined time period following the vehicle ignition being turned on and (v) the vehicle moving above a threshold speed.

16. The handle assembly of claim 15, wherein, when a lockout condition is determined, said control limits movement of said handle portion irrespective of the trigger.

17. The handle assembly of claim 1, wherein said first and second gear elements comprise ramped teeth and wherein said second gear element moves along the ramped teeth of said first gear element to slip said second gear element relative to said first gear element when said handle portion is manually moved toward said recessed position.

18. The handle assembly of claim 1, wherein said control is operable to move said handle portion from said partially extended position towards said recessed position responsive to elapsing of a period of time after said handle portion is moved from said recessed position to said partially extended position.

19. The handle assembly of claim 1, wherein said second gear element rotates with an output element of said actuator and wherein said output element engages said handle portion to cause pivotal movement of said handle portion relative to said base portion.

20. The handle assembly of claim 19, wherein, when said output element is rotatably driven in a first direction, said handle portion pivots toward said partially extended position, and wherein, when said output element is rotatably driven in a second direction, said handle portion pivots toward said recessed position, and wherein said clutch allows for rotation of said output element in said second direction when said handle portion has been moved toward said partially extended position via rotatable driving of said output element in said first direction.

21. The handle assembly of claim 1, wherein, when said handle portion is at said recessed position, a portion of said handle portion at one side of a pivot axis of said handle portion is manually movable inward toward said base portion to cause another portion of said handle portion at an opposite side of said pivot axis to move outward from said base portion to move said handle portion toward said partially extended position without operation of said motor.

22. A handle assembly for a door of a vehicle, said handle assembly comprising:

a base portion mounted at or incorporated into a structure of the door of the vehicle;

a handle portion pivotable relative to said base portion, wherein said handle portion is pivotable between a recessed position, where said handle portion is at least partially recessed at said base portion so as to be not readily graspable by a user, and a partially extended position, where said handle portion extends partially outward from said base portion to be graspable by the user;

wherein said handle portion pivots about a pivot axis when pivoting between said recessed position and said partially extended position;

wherein a first portion of said handle portion is at a first side of said pivot axis and a second portion of said handle portion is at a second side of said pivot axis;

a control operable to pivot said handle portion from said recessed position to said partially extended position responsive to a trigger;

wherein said control operates a motor of an actuator of said handle assembly and wherein operation of said motor pivots said handle portion between said recessed position and said partially extended position;

wherein said control controls said actuator to move said handle portion from said recessed position to said partially extended position responsive to said trigger;

wherein said first portion of said handle portion is received in said base portion when said handle portion is in said recessed position, and wherein said first portion is not readily graspable by the user when said handle portion is in said recessed position;

wherein said actuator engages a guide element of said handle portion to move said guide element in a generally arcuate path to impart pivotal movement of said handle portion about a pivot pin that pivotally mounts said handle portion to said base portion;

wherein, when said handle portion is at said partially extended position, said first portion of said handle portion is extended from said base portion so as to be graspable by the user and manually movable further outward from said base portion to open the door of the vehicle; and wherein, when said handle portion is at said recessed position, said second portion of said handle portion is manually movable by the user in a direction inward toward said base portion to cause said handle portion to pivot about said pivot axis so that said first portion of said handle portion moves outward from said base portion and said handle portion pivots toward said partially extended position without operation of said motor.

23. The handle assembly of claim 22, wherein said actuator comprises a clutch that provides a manual override that, when said handle portion is pivoted toward said partially extended position via operation of said motor of said actuator, allows the user to manually pivot said handle portion toward said recessed position.

24. The handle assembly of claim 22, wherein said trigger comprises at least one of (a) a signal from a passive entry device, (b) a signal from a remote transmitting device and (c) a signal indicative of the user actuating a door unlock button of the vehicle.

* * * * *

UNITED STATES PATENT AND TRADEMARK OFFICE

CERTIFICATE OF CORRECTION

PATENT NO. : 8,786,401 B2
APPLICATION NO. : 12/976594
DATED : July 22, 2014
INVENTOR(S) : Justin E. Sobecki et al.

It is certified that error appears in the above-identified patent and that said Letters Patent is hereby corrected as shown below:

In the Specification

Column 4
Line 36-37, “PCT/US08/062,347” should be --PCT/US08/062347--

Column 13
Line 40, “PCT/US08/062,047” should be --PCT/US08/062347--
Line 44-45, “PCT/US08/062,047” should be --PCT/US08/062347--

Signed and Sealed this
Thirtieth Day of June, 2015

Michelle K. Lee

Michelle K. Lee
*Director of the United States Patent and Trademark Office*